(12) United States Patent
Kunitomo et al.

(10) Patent No.: US 11,980,964 B2
(45) Date of Patent: May 14, 2024

(54) MEMBER AND METHOD OF MANUFACTURING THE SAME

(71) Applicant: Proterial, Ltd., Tokyo (JP)

(72) Inventors: Kenichiro Kunitomo, Tokyo (JP); Shuho Koseki, Tokyo (JP); Hiroshi Shiratori, Tokyo (JP); Hirotsugu Kawanaka, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 846 days.

(21) Appl. No.: 17/053,814

(22) PCT Filed: Jul. 2, 2019

(86) PCT No.: PCT/JP2019/026331
§ 371 (c)(1),
(2) Date: Nov. 9, 2020

(87) PCT Pub. No.: WO2020/009115
PCT Pub. Date: Jan. 9, 2020

(65) Prior Publication Data
US 2021/0237204 A1 Aug. 5, 2021

(30) Foreign Application Priority Data
Jul. 6, 2018 (JP) .................................. 2018-128913

(51) Int. Cl.
*B23K 26/00* (2014.01)
*B23K 11/00* (2006.01)
(Continued)

(52) U.S. Cl.
CPC ...... *B23K 26/0093* (2013.01); *B23K 11/0013* (2013.01); *B23K 26/144* (2015.10); *B23K 26/342* (2015.10); *B33Y 10/00* (2014.12)

(58) Field of Classification Search
CPC .............. B23K 26/0093; B23K 26/144; B23K 26/342; B23K 11/0013; B21D 24/16
See application file for complete search history.

(56) References Cited

U.S. PATENT DOCUMENTS

2011/0057360 A1 3/2011 Clark et al.
2014/0096583 A1* 4/2014 Cho ..................... B21D 22/208
72/332

(Continued)

FOREIGN PATENT DOCUMENTS

JP H05-005593 B2 1/1993
JP H05-309404 A 11/1993
(Continued)

OTHER PUBLICATIONS

JP H10-291070 A (Tanaka, Keizo) Nov. 4, 1998 [retrieved on Dec. 16, 2023]. Retrieved from https://www.j-platpat.inpit.go.jp/, translation by JPO and INPIT. (Year: 1998).*

(Continued)

*Primary Examiner* — John J Norton
(74) *Attorney, Agent, or Firm* — Volpe Koenig

(57) ABSTRACT

A member includes a first metallic region made of a first material; a second metallic region made of a second material that is a different from the first material; and a mix region made of mixture of the first and second materials between the first and second metallic region. In a cross-sectional view, an interface between the first metallic region and the mix region is represented by a line having a first curved line protruding toward the first metallic region and a second curved line protruding toward the first metallic region, and an angle at a cross point of the first and second curved lines, the angle being made by a tangent line of the first curved line (Continued)

and a tangent line of the second curved line in a region of the first metallic region, is equal to or larger than 70 degrees and smaller than 180 degrees.

16 Claims, 13 Drawing Sheets

(51) Int. Cl.
*B23K 26/144* (2014.01)
*B23K 26/342* (2014.01)
*B33Y 10/00* (2015.01)

(56) References Cited

U.S. PATENT DOCUMENTS

| | | |
|---|---|---|
| 2017/0129180 A1 | 5/2017 | Coates et al. |
| 2019/0111488 A1 | 4/2019 | Ohishi et al. |
| 2019/0111517 A1 | 4/2019 | Muratani et al. |

FOREIGN PATENT DOCUMENTS

| | | |
|---|---|---|
| JP | H08-296419 A | 11/1996 |
| JP | H10-291070 A | 11/1998 |
| JP | 2002-219567 A | 8/2002 |
| JP | 2005088042 A * | 4/2005 |
| JP | 3755404 B2 | 3/2006 |
| JP | 2017-206852 A | 11/2017 |
| WO | 2017/170890 A1 | 10/2017 |

OTHER PUBLICATIONS

JP 2005-088042 A (Yamazaki, Hisao) Apr. 7, 2005 [retrieved Dec. 16, 2023]. Retrieved from Foreign Image and Text database, translation by Clarivate Analytics. (Year: 2005).*

International Search Report and English Translation, PCT/JP2019/026331, dated Aug. 6, 2019, 3 pages.

Extended European Search Report issued on Apr. 8, 2022 for European Patent Application No. 19830646.6.

* cited by examiner

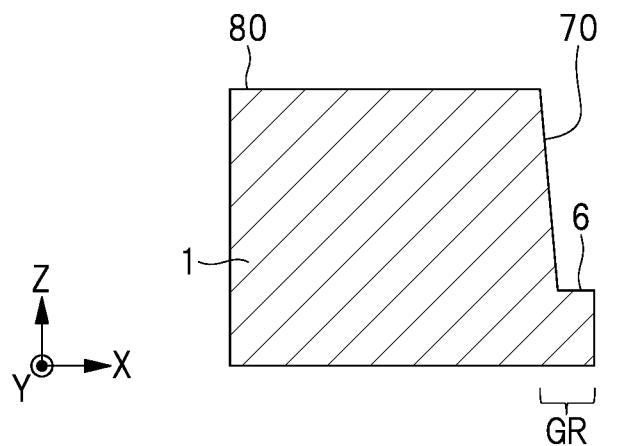
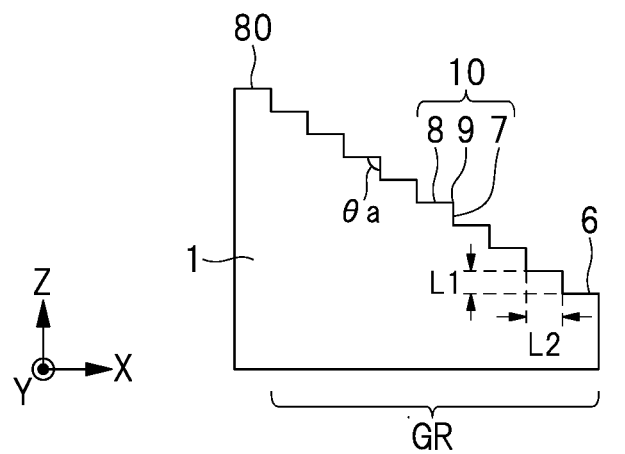

A-A CROSS-SECTIONAL SURFACE

A-A CROSS-SECTIONAL SURFACE

1: BASE MEMBER  2: SHAPED ARTICLE  3: MIX REGION
4: INTERFACE    4a, 4b: CURVED LINE  5: VERTEX
θ c: ANGLE

FIG. 25

(LEFT) TILTED SURFACE

| ANGLE | 57 | 109 | 121 | 71 | 70 | 135 | 134 |
|---|---|---|---|---|---|---|---|
| CRACK EVALUATION | × | ○ | ○ | ○ | ○ | ○ | ○ |

(RIGHT) TILTED SURFACE

| ANGLE | UNMEASURABLE | 124 | 135 | 139 | 88 |
|---|---|---|---|---|---|
| CRACK EVALUATION | × | ○ | ○ | ○ | ○ |

× : WITH CRACK NEAR VERTEX
○ : WITHOUT CRACK NEAR VERTEX

FIG. 26

(LEFT) STAIR

| ANGLE | 134 | 133 | 131 | 135 | 132 | 135 | 141 |
|---|---|---|---|---|---|---|---|
| CRACK EVALUATION | ○ | ○ | ○ | ○ | ○ | ○ | ○ |

(RIGHT) STAIR

| ANGLE | 118 | 140 | 158 | 144 | 139 | 137 | 134 |
|---|---|---|---|---|---|---|---|
| CRACK EVALUATION | ○ | ○ | ○ | ○ | ○ | ○ | ○ |

× : WITH CRACK NEAR VERTEX
○ : WITHOUT CRACK NEAR VERTEX

MEMBER AND METHOD OF MANUFACTURING THE SAME

TECHNICAL FIELD

The present invention relates to a member and a method of manufacturing the same, and, more particularly relates to a built-up welded member that is formed by additive (layer) manufacturing of dissimilar metals.

BACKGROUND ART

In order to weld a plurality of types of metals, various additive manufacturing techniques have been developed. For example, a Patent Document 1 discloses that a member made of dissimilar metals is manufactured by a plasma powder buildup welding method to build-up a high alloy material on a groove formed in a rolling mill roll (for example, a low-alloy steel such as SCM440). As a method of correcting a mold by using an automatic machining apparatus having a welding tool and capable of teaching, a Patent Document 2 discloses that a portion to be corrected is machined so as to have a stair-shaped cross-sectional surface, and then, a weld material is built up on the stair-shaped portion, then, the mold is machined and corrected so as to have a target shape.

RELATED ART DOCUMENTS

Patent Documents

Patent Document 1: Japanese Patent Application Laid-Open Publication No. 1105-309404
Patent Document 2: Japanese Patent Application Laid-Open Publication No. 2002-219567

SUMMARY OF THE INVENTION

Problems to be Solved by the Invention

For example, the mold has such a problem that a specific portion is susceptible to wear or damage. For such a specific portion, it is effective to provide a member (referred to as a mold member sometimes) to a part of the mold by taking the additive manufacturing technique or others to improve a strength of the part of the mold or repair the part of the mold. And, it is desirable to improve reliability of the member made of the dissimilar metals by improvement of a joint force of a boundary surface at which the dissimilar metals are in contact with each other. However, the Patent Documents 1 and 2 do not disclose features of and a method of manufacturing the dissimilar metallic members that meet such a demand. And, the Patent Documents do not disclose that, for example, a method taking laser metal deposition (LMD) using laser light is applied for manufacturing the member. Therefore, the manufactured member has a risk of occurrence of a gap and a crack.

Other objects and novel characteristics will be apparent from the description of the present specification and the accompanying drawings.

Means for Solving the Problems

The outline of the typical aspects of the inventions disclosed in the present application will be briefly described as follows.

A member according to one embodiment includes: a first metallic region made of a first material; a second metallic region made of a second material that is a different material from the first material; and a mix region made of mixture of the first material and the second material between the first metallic region and the second metallic region. In this case, in a cross-sectional view, an interface between the first metallic region and the mix region is represented by a line having a first curved line protruding toward the first metallic region and a second curved line protruding toward the first metallic region, and an angle at a cross point of the first curved line and the second curved line is equal to or larger than 70 degrees and smaller than 180 degrees, the angle being made by a tangent line of the first curved line and a tangent line of the second curved line in a region of the first metallic region.

A member according to another embodiment includes: a first metallic region made of a first material; and a second metallic region made of a second material that is a different material from the first material. In this case, in a cross-sectional view, an interface between the first metallic region and the second metallic region is represented by a line having a first curved line protruding toward the first metallic region and a second curved line protruding toward the first metallic region, and an angle at a cross point of the first curved line and the second curved line is equal to or larger than 70 degrees and smaller than 180 degrees, the angle being made by a tangent line of the first curved line and a tangent line of the second curved line in a region of the first metallic region.

A member according to still another embodiment includes: a first metallic region made of a first material; a second metallic region made of a second material that is a different material from the first material; and a mix region made of mixture of the first material and the second material between the first metallic region and the second metallic region. In this case, an interface between the first metallic region and the second metallic region is represented by a plane having an arc-shaped first curved plane protruding toward the first metallic region and an arc-shaped second curved plane protruding toward the first metallic region. An aperture angle at a ridge line that is a line of intersection of the respective tangent lines of the first curved plane and the second curved plane is equal to or larger than 70 degrees and smaller than 180 degrees, the aperture angle being made by the first curved plane and the second curved plane in a region of the first metallic region.

A method of manufacturing a member according to still another embodiment includes: (a) a step of preparing a base member made of a first material; (b) a step of forming a plurality of stepwise stairs each having an upper surface, a side surface and a corner by machining the base member; and (c) a step of buildup-welding a shaped article on the base member by using an additive manufacturing method that supplies a powder material that is a second material that is different from the first material into a spot diameter of laser light while emitting the laser light. In this case, the laser light is emitted to the base member so as to be emitted to at least one of the corners. Other embodiments will be defined later.

Effects of the Invention

According to one embodiment disclosed in the present application, the gap and the crack in the member made of the dissimilar metals can be eliminated, and the reliability of the member in the mechanical strength can be improved. The member as described above can be manufactured by using the LMD method.

BRIEF DESCRIPTIONS OF THE DRAWINGS

FIG. 5 is a cross-sectional view showing a manufacturing step of the mold member of the first embodiment;

FIG. 6 is a cross-sectional view showing a manufacturing step continued from FIG. 5;

FIG. 25 is a shape measuring result of a member having a tilted side surface; and FIG. 26 is a shape measuring result of a member having a side surface made of a plurality of stairs.

BEST MODE FOR CARRYING OUT THE INVENTION

Hereinafter, embodiments of the present invention will be described in detail on the basis of the accompanying drawings. Note that components having the same function are denoted by the same reference symbols throughout all the drawings for describing the embodiments, and the repetitive description thereof will be omitted. In the following embodiments, the explanation for the same or similar parts are not repeated in principle unless otherwise particularly required.

First Embodiment

In the present embodiment, a mold member that is a member for use in a mold will be mainly explained as one example of a dissimilar metallic joint member. And, a method of manufacturing the mold member on the basis of an additive manufacturing technique using laser light will be explained.

<Regarding Additive Manufacturing Technique Based on LMD Method>

First, the LMD method that is one of the additive manufacturing techniques for use in the present embodiment will be explained. The LMD method is also referred to as a laser metallic depositing method, a laser powder buildup welding method or others. In the following explanation, the additive manufacturing based on the LMD method will be referred to as buildup welding, and a case of usage of cermet powder as the powder material will be explained.

Figure 1:
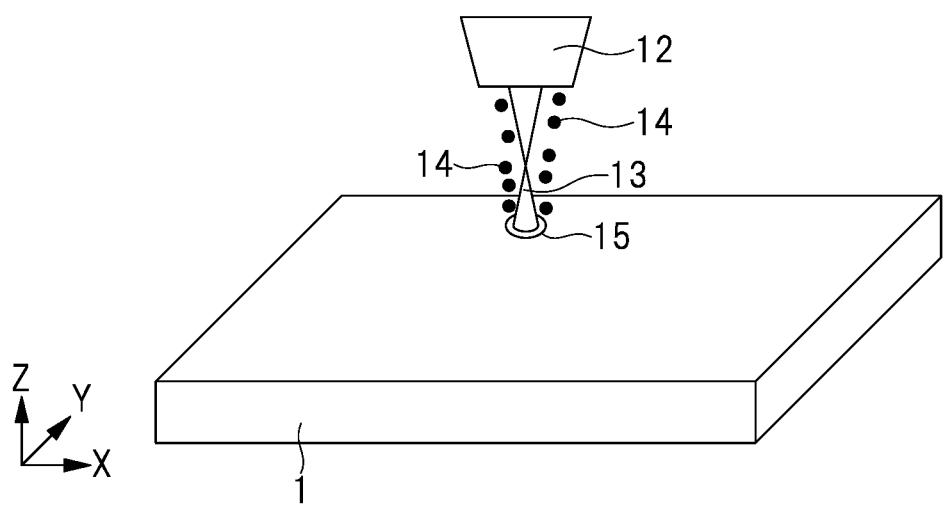
FIG. 1 is a perspective view showing outline of the LMD method for use in a first embodiment.

FIG. 1 is a perspective view showing outline of an ordinary LMD method. In FIG. 1, an X direction, a Y direction and a Z direction are shown, and these directions are perpendicular to one another. The Z direction is a vertical direction and is a thickness direction of the base member 1. A plane made by the X and Z directions is a cross section that is perpendicular to the Y direction and is a cross section of each of the base member 1 and later-described mold members 20A to 20F, taken along a line A-A. Such relation among these directions is similarly set in FIG. 2 and each subsequent drawing. Note that the relation among the X direction, the Y direction, the Z direction and the cross section is represented by the "cross section taken along the line A-A". In the case of the mold member or the member on the perspective view, the frontmost surface of the corresponding member on the perspective view shows the cross section taken along the line A-A.

A laser head 12 shown in FIG. 1 is a part of a laser-light emission apparatus, and includes a laser-light emission mechanism and a powder-material supply mechanism Laser light 13 that is emitted in the Z direction from the laser head 12 is emitted to the base member 1, and a powder material 14 is supplied from the laser head 12 to a region to which the laser light 13 is emitted. When a metal contained in the base member 1 and a metal contained in the powder material 14 are melted by the laser light 13, a melt pool 15 is formed in a part of the base member 1.

The laser head 12 is allowed to scan in the X and Y directions, and the laser light 13 is displaced to a different region to harden each metal of the melt pool 15, so that a weld object is formed. By repeat of the machining using the scanning by the laser light 13, the layered weld objects are formed on the base member 1. Such layered weld objects become a shaped article 2 described later. As one example, note that the laser light 13 is displaced by a displacing mechanism (illustration is omitted) that changes a relative position between the laser head 12 and the base member 1. One example of the displacing mechanism is a movable stage to which the base member 1 is fixed or a robot arm capable of supporting the laser head 12 so as to be movable.

A structure of and a method of manufacturing the mold member 20A of the present embodiment will be explained below. However, before that, first and second comparative examples will be explained first.

<Mold Member 20E of First Comparative Example>

Figure 20:
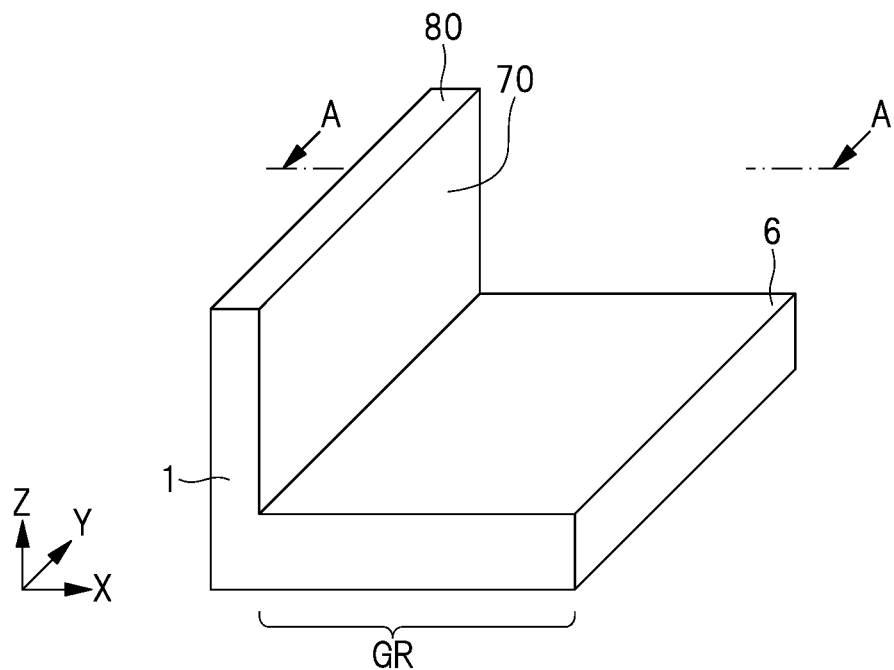
FIG. 20 is a perspective view showing a base member of a first comparative example.
Figure 21:
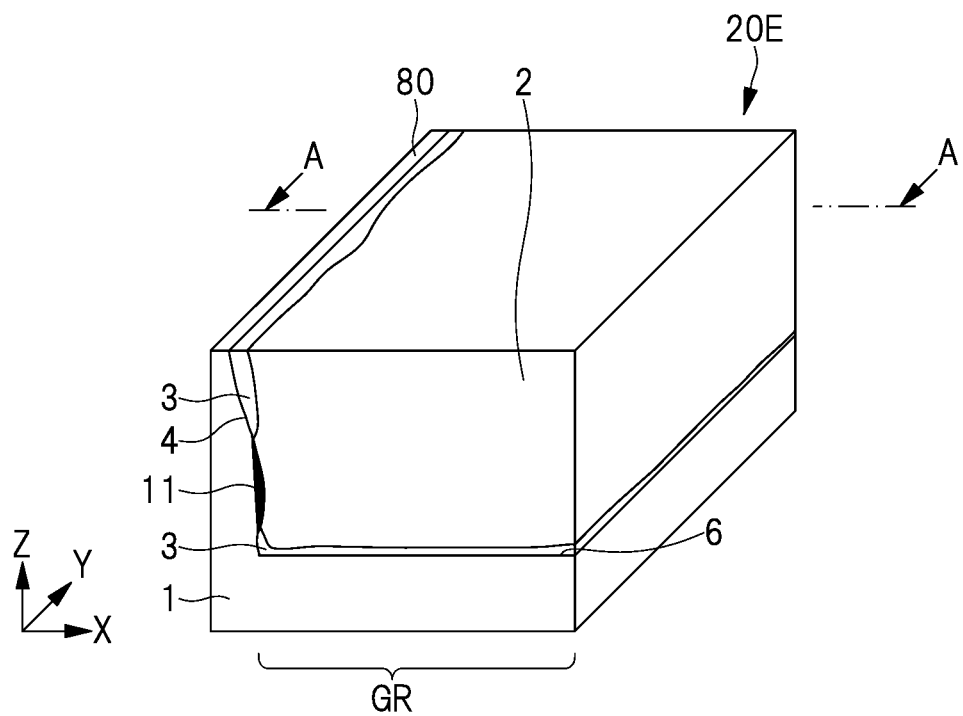
FIG. 21 is a perspective view showing a mold member of the first comparative example.

The mold member 20E of the first comparative example will be explained below with reference to FIGS. 20 and 21. FIG. 20 is a perspective view showing a structure of the base member 1 obtained before the mold member 20E is completed. FIG. 21 is a perspective view showing a structure of the mold member 20E having the shaped article 2 formed on the base member 1.

As shown in FIG. 20, a dent portion (such as a groove or a gap) GR that is lower in a height than the uppermost surface 80 of the base member 1 is formed in the base member 1, and the dent portion GR includes a bottom surface 6 and a side surface 70. In this case, an angle made by the bottom surface 6 and the side surface 70 in the first comparative example is a perpendicular angle.

As shown in FIG. 21, the mold member 20E includes the base member 1 and the shaped article 2 welded on the base member 1. The shaped article 2 is a region having the deposited weld objects formed by melting the base member 1 and the powder material 14 by the LMD method. A mix region 3 is a part of the shaped article 2 as well as being a region where the shaped article 2 is in contact with the base member 1. In other words, the mix region 3 is a region where a metal contained in the material of the base member 1 and a metal contained in the powder material 14 are mixed to each other. An interface 4 shows an interface that is a boundary between the base member 1 and the mix region 3.

As described above, the laser light 13 for use in forming the shaped article 2 including the mix region 3 is emitted in the Z direction. In other words, the laser light 13 is directly emitted to the bottom surface 6 of the dent portion GR and the uppermost surface 80 of the base member 1 but is hardly emitted to the side surface 70 of the dent portion GR. Therefore, the base member 1 and the powder material 14 are easy to melt around the bottom surface 6 of the dent portion GR and the uppermost surface 80 of the base member 1 but are difficult to melt around the side surface 70 of the dent portion GR. Therefore, as shown with a black-colored portion in FIG. 21, there is a risk of occurrence of defects such as the gap 11 around the side surface 70 between the base member 1 and the shaped article 2. The occurrence of such a gap 11 reduces adhesion between the base member 1 and the shaped article 2, so that failure such as peeling off of the shaped article 2 from the base member 1 easily occurs. In other words, the joint force is weakened.

<Mold Member 20F of Second Comparative Example>

A mold member 20F of a second comparative example will be explained below with reference to FIGS. 22 to 24. Note that differences from the first comparative example will be mainly explained below.

Figure 22:
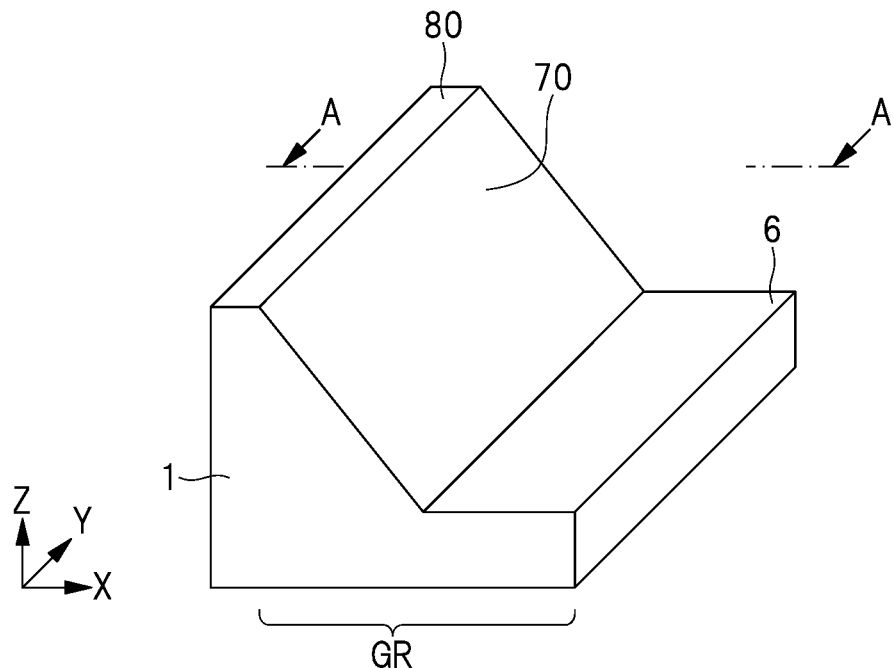
FIG. 22 is a perspective view showing a base member of a second comparative example.
Figure 23:
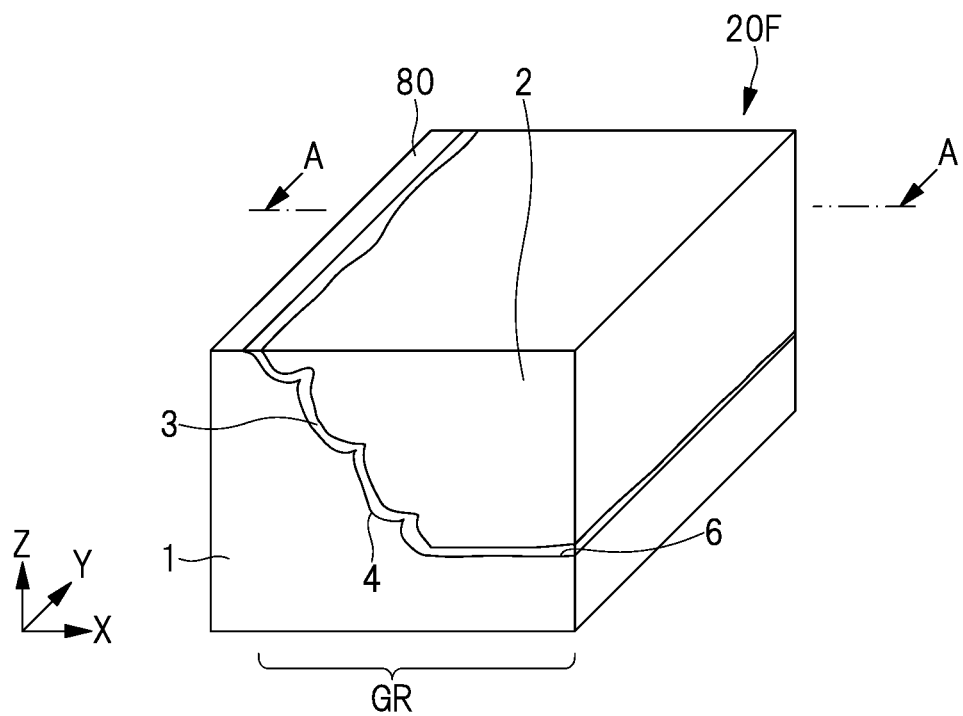
FIG. 23 is a perspective view showing a mold member of the second comparative example.

FIG. 22 is a perspective view showing a structure of a base member 1 obtained before the mold member 20F is completed. FIG. 23 is a perspective view showing a structure of the mold member 20F having the shaped article 2 formed on the base member 1. FIG. 24 is a part of a cross-sectional view taken along the line A-A shown in FIG. 23, and is a cross-sectional view showing an enlarged principal part of the mold member 20F. While FIG. 24 is the cross-sectional view, hatching is omitted in order to easily understand the drawing.

As shown in FIG. 22, the side surface 70 of the base member 1 of the second comparative example is not perpendicular to the bottom surface 6 but is tilted by a certain angle from the bottom surface 6 to the uppermost surface 80. This tilt angle is, for example, 40 to 60 degrees.

Therefore, in the second comparative example, the laser light 13 is also easily emitted to the side surface 70. Thus, as shown in FIG. 23, in the mold member 20F of the second comparative example, the defects such as the gap 11 of the first comparative example can be suppressed from occurring between the base member 1 and the shaped article 2.

However, according to the studies of the inventions of the present application, in the mold member 20F of the second comparative example, it has been found that the crack easily occurs in the mix region 3 or the shaped article 2. The mix region 3 is a region where the metal contained in the base member 1 and the metal contained in the powder material 14 are mixed, and is a region that is rapidly hardened after the emission of the laser light 13. The hardened mix region 3 is a non-equilibrium unstable region where residual stress easily occurs.

Figure 24:
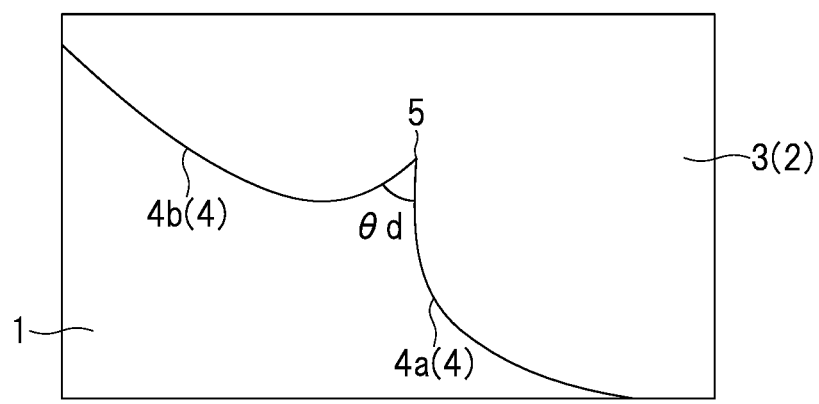
FIG. 24 is a cross-sectional view showing an enlarged principal part of the mold member of the second comparative example.

Here, as shown in FIG. 24, in the cross-sectional view, the interface 4 that is the boundary between the base member 1 and the mix region 3 is represented by a line having a curved line 4a and a curved line 4b. And, at a vertex 5 that is a cross point between the curved line 4a and the curved lined 4b, an angle "θd" made by the curved line 4a and the curved line 4b in a region of the base member 1 is an acute angle often.

As described above, the larger the acute angle at the vertex 5 is, the more the vertex 5 is susceptible to concentration of the residual stress. Accordingly, because of the residual stress, the mix region 3 or the shaped article 2 is susceptible to cracking generated from this vertex 5 serving as a point of origin. Therefore, the mold member 20F has a risk of failure to generate the originally-designed shape and/or strength. Further, when such a crack occurs at many points of the interface 4, defects such as the peeling off of the shaped article 2 from the base member 1 occurs, and the joint force is weakened. Besides, there is a risk of occurrence of defects such as corrosion or oxidization of the shaped article 2 or the base member 1 since water or oxygen in air, etc., enter therein from outside of the mold member 20F through the crack. Particularly when cermet is used as the powder material 14, the crack easily propagates, which easily results in damage on the entire mold member 20F since a hardness of the shaped article is high.

<Mold 100 and Mold Member 20A of Present Embodiment>

Figure 2:
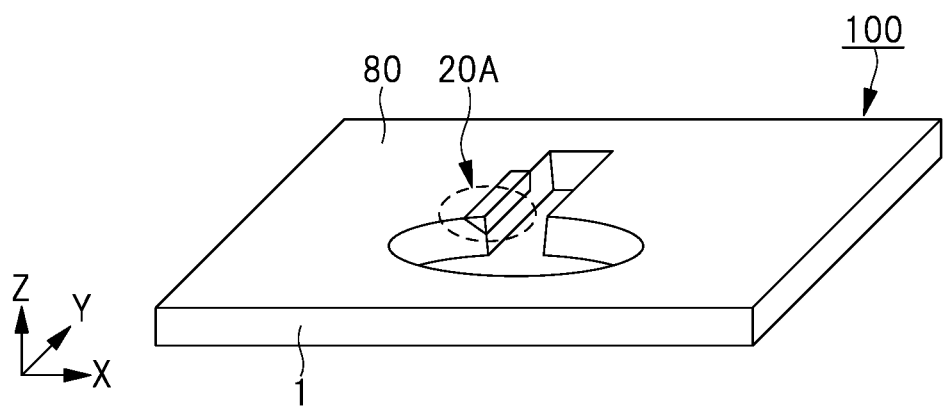
FIG. 2 is a perspective view showing a mold and a mold member of the first embodiment.
Figure 3:
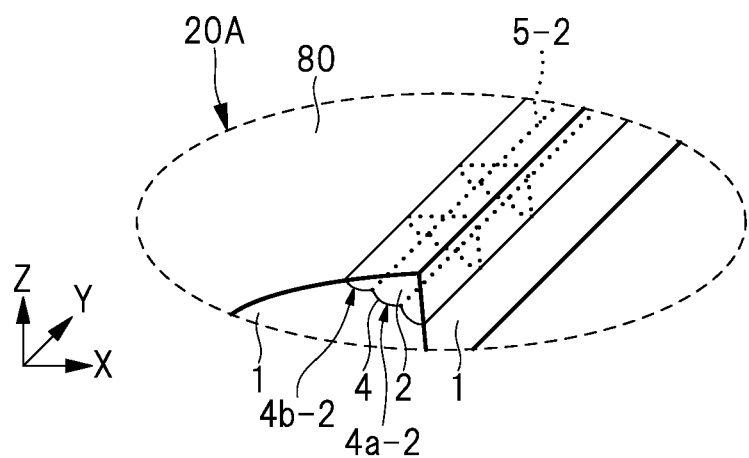
FIG. 3 is a perspective view showing an enlarged principal part of the mold of the first embodiment.

FIG. 2 is a perspective view showing a mold 100 and a mold member 20A of the present embodiment. FIG. 3 is a perspective view showing a part illustrated with a broken line of FIG. 2 and showing an enlarged principal part of the mold 100. In FIG. 3, a shape of the interface 4 is illustrated with a dotted line for convenience.

As shown in FIG. 2, the mold 100 is made of the base member 1. In the present example, a part of the base member 1 has a cutout having a key-hole shape penetrating the base member 1. In other words, the mold 100 that is exemplified in the present embodiment is a female-type mold for use in ladle-type press shaping. In the present embodiment, a side of the uppermost surface 80 that is an upper surface of the mold 100 is described as an upper side.

As shown in FIGS. 2 and 3, on a shoulder of the cutout of the mold 100, the mold member 20A that is a member for use in the mold 100 is formed. The mold member 20A is a member made by, on the base member 1, the buildup welding of the shaped article 2 having higher strength than the base member 1 in order to reinforce a part such as the shoulder of the cutout of the mold 100, that is particularly susceptible to wear or damage. The shaped article 2 is formed on the shoulder existing from the upper surface of the mold 100 to the side surface of the mold 100, and is exposed.

The mold member 20A is a part of the mold 100, and is unified with the mold 100. In other words, the base member 1 of the mold 100 is unified with the base member 1 of the mold member 20A. Note that the mold 100 may include a plurality of mold members. However, in the present embodiment, the mold member 20A that is one of such a plurality of mold members will be explained.

With reference to FIGS. 4 to 12, a method of manufacturing the mold member 20A, a structure of the same and features of the method and the structure will be explained below. Note that each of FIGS. 5 to 10 corresponds to the cross-sectional view taken along the line A-A shown in FIG. 4.

Figure 4:
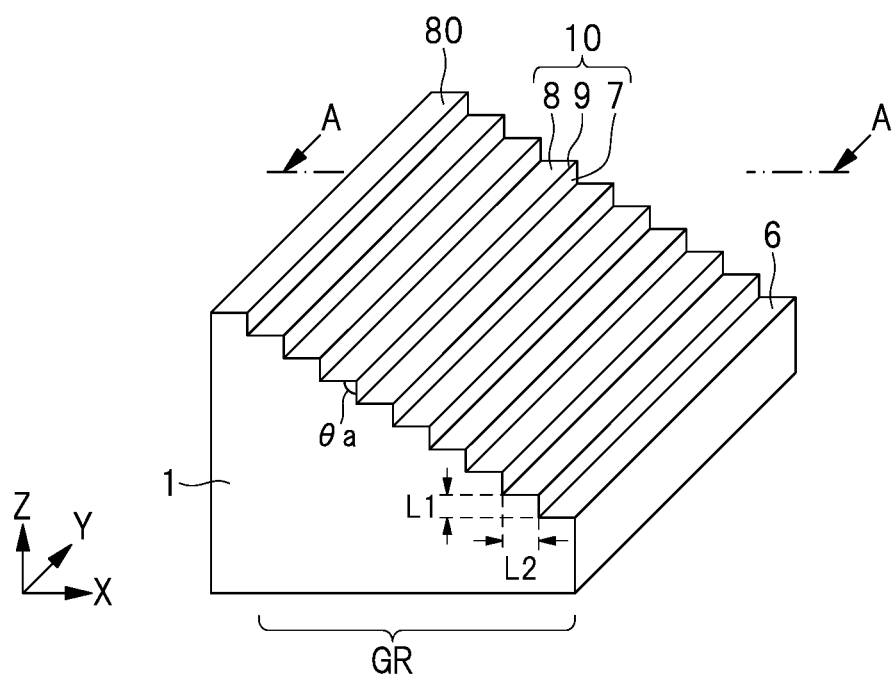
FIG. 4 is a perspective view showing the base member of the first embodiment.
Figure 11:
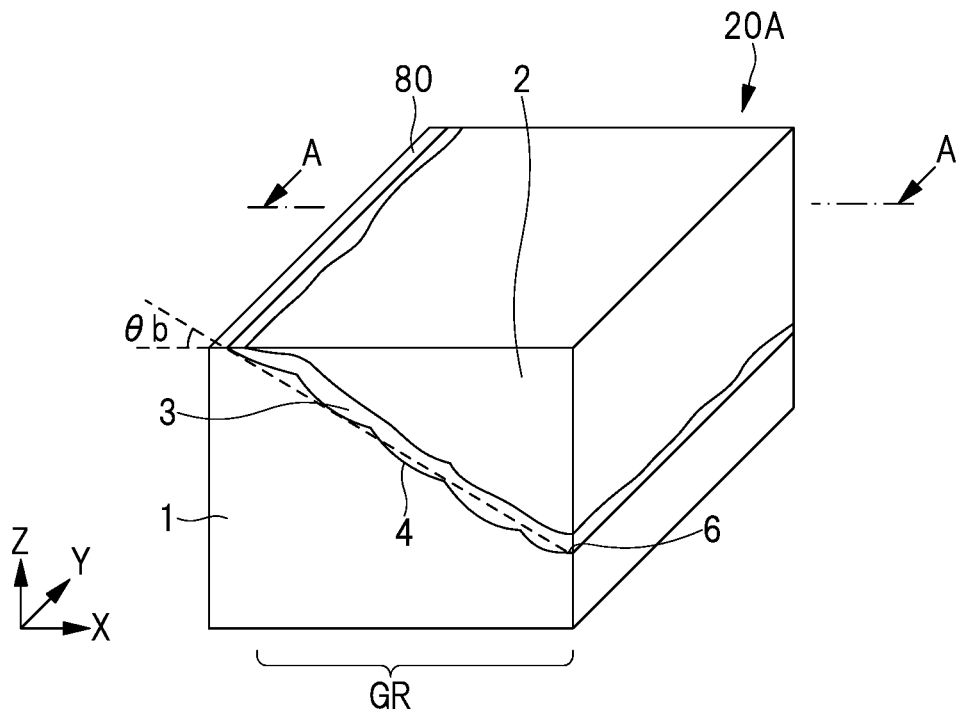
FIG. 11 is a perspective view showing a mold member of the first embodiment.

FIG. 4 is a perspective view showing a structure of the base member (first metallic region) 1 obtained before the mold member 20A is completed. At the last stage, the shaped article (second metallic region) 2 is built up and welded on the shoulder of this base member 1, so that the mold member 20A shown in FIG. 11 is manufactured.

As shown in FIG. 4, in the base member 1, the dent portion GR that is a portion lower than the uppermost surface 80 of the base member 1 is formed. The dent portion GR has a plurality of stairs 10 that are formed stepwise (the stepwise-form structure is simply referred to as "stairs" below) from the bottom surface 6 of the dent portion GR to the uppermost surface 80 of the base member 1. Each of the stairs 10 has a side surface 7, an upper surface 8 and a corner 9 made by the side surface 7 and the upper surface 8. Note that the uppermost stair of the stairs 10 is made of the side surface 7 and the uppermost surface 80.

Regarding the corner 9, an angle "θa" made by the side surface 7 and the upper surface 8 is preferably in a range that is equal to or larger than 90 degrees and equal to or smaller than 120 degrees, more preferably that is 90 degrees. In a case of a corner 9 (temporarily referred to as "corner having an acute angle") having an angle that is smaller than 90 degrees, the side surface 7 and a part of the upper surface 8 that are hidden by the corner having the acute angle are observed when viewed from right above the corner having the acute angle. As a result, the laser emission amount on the side surface 7 and the upper surface 8 is insufficient, and the failure in the melting of the base member 1 occurs in some cases. A length (height) L1 of the side surface 7 is preferably in a range that is, for example, equal to or larger than 0.2 mm and equal to or smaller than 1.2 mm, most preferably that is 0.6 mm. A length (width) L2 of the upper surface 8 is preferably, for example, equal to or larger than 0.3 mm, most preferably is 1.0 mm. Therefore, a ratio (length L1/length L2) of the length L1 of the side surface 7 to the length L2 of the upper surface 8 can be set to be equal to or smaller than 4, but is preferably equal to or smaller than 1.2 (that is equal to or smaller than 50 degrees when being expressed as an angle rounded to zero decimal place), more preferably equal to or smaller than 0.6 (that is equal to or smaller than 31 degrees when being expressed as an angle rounded to zero decimal place). A reason why the shape of the stair 10 is formed as described above will be explained in detail later.

Steps of preparing such a base member 1 will be explained with reference to FIGS. 5 and 6. Although FIG. 6 is a cross-sectional view, hatching is omitted in order to easily understand the drawing.

First, as shown in FIG. 5, the base member 1 (first metallic region) made of a first material and having the dent portion GR formed therein is prepared. The dent portion GR has the bottom surface 6 and a side surface 70, and is a part of the base member 1, the part being lower than the uppermost surface 80 of the base member 1. The base member 1 is made of a metal material such as steel (including stainless steel and tool steel) and nickel alloy (including nickel-base alloy).

Next, as shown in FIG. 6, the stairs 10 are formed in the base member 1 by machining the side surface 70 of the base member 1 while using, for example, a cutting machine or wire-cut electrical discharge machining. As described above, each of the stairs 10 has the side surface 7, the upper surface 8 and the corner 9. In the manner, the dent portion GR is enlarged.

With reference to FIGS. 7 to 11, the following is explanation on a manufacturing method of forming the mold member 20A by the buildup welding of the shaped article 2 (second metallic region) made of a second material onto the base member 1 (first metallic region) made of the first material prepared by the steps of FIGS. 5 and 6. The present embodiment takes the LMD method explained in FIG. 1, in other words, takes the additive manufacturing method of supplying the powder material 14 into the spot diameter of the laser light 13 together with the emission of the laser light 13.

Figure 7:
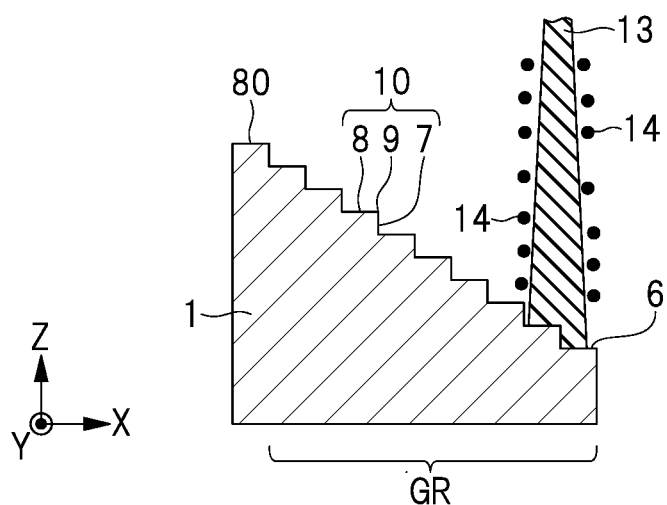
FIG. 7 is a cross-sectional view showing a manufacturing step continued from FIG. 6.

First, as shown in FIG. 7, the powder material 14 is supplied into the spot diameter of the laser light 13 while the laser light 13 is emitted to the base member 1 by using a laser-light emission apparatus (laser head 12) explained in FIG. 1. For example, an output power of the laser light 13 is equal to or smaller than 3000 W, the spot diameter of the laser light 13 is 1.6 to 3.0 mm, and a type of the laser light is diode laser. Note that fiber laser or YAG laser may be applied as long as the powder material 14 can be melted.

The powder material 14 for use as the second material is made of, for example, powder cermet. One example of the cermet is a composite material formed by mixture of the following raw materials A and B. In the present invention, note that such a composite material is also contained in the metallic region.

Raw Material A: Carbide, Nitride, Boride or Silicide of any metal of Tungsten (W), Titanium (Ti), Tantalum (Ta) or Niobium (Nb)

Raw Material B: Any metal of Iron (Fe), Nickel (Ni), Copper (Cu) or Cobalt (Co)

Note that the cermet in the present specification includes cemented carbide such as tungsten carbide. As described above, the mold member 20A is formed in order to reinforce the part of the mold 100, the part being particularly susceptible to wear or damage. Therefore, in the mold member 20A, the higher strength is necessary for the shaped article 2 than the base member 1. Thus, the cermet contained in the powder material 14 that is a main material of the shaped article 2 has the higher strength than the materials contained in the base member 1, and this point is one of favorable reasons. Note that the "high strength" in the present embodiment means high hardness, high wear resistance and/or high heat resistance (high melting point).

As shown in FIG. 7, in the present embodiment, the laser light 13 is emitted so as to lay on at least two adjacent upper surfaces 8. In other words, at least one corner 9 is included inside the spot diameter of the laser light 13. FIG. 7 exemplifies a case in which the laser light 13 is emitted so as to lay on the bottom surface 6 and the closest upper surface 8 to the bottom surface 6 so that one corner 9 is included inside the spot diameter of the laser light 13. In the manner, the base member 1 and the powder material 14 are melted in not only the upper surface 8 and the bottom surface 6 but also the side surface 7.

As described above, the first comparative example has the problem of the difficulty in melting of the base member 1 and the powder material 14 at a portion near the side surface 70 of the dent portion GR but easiness in melting of them at a portion near the bottom surface 6 of the dent portion GR and a portion near the uppermost surface 80 of the base member 1 since the height from the bottom surface 6 of the dent portion GR to the uppermost surface 80 of the base member 1 is large, and therefore, has the risk of the occurrence of the gap 11.

On the other hand, in the present embodiment, the shape of the stair 10 is adjusted so that the length L1 of the side surface 7 is about 0.6 mm and so that the value of the "length L1/length L2" is equal to or smaller than 0.6. Since the length L1 of the side surface 7 of each stair 10 is small as descried above, not only the portion near the upper surface 8 but also the portion near the side surface 7 are sufficiently heated by the laser light 13 emitted to the corner 9. In other words, the base member 1 and the powder material 14 are melted in not only the portion near the upper surface 8 but also the portion near the side surface 7. Therefore, the risk of the occurrence of the gap 11 as observed in the first comparative example can be suppressed.

When the laser light 13 is emitted to not the corner 9 but only the upper surface 8, there is a risk of failure to propagate the heat from the upper surface 8 to, for example, middle of the side surface 7. In this case, the side surface 7 is not sufficiently heated, and the side surface 7 has the risk of the occurrence of the gap 11 as observed in the first comparative example. Therefore, it is important to put at least one corner 9 to be included inside the spot diameter of the laser light 13. Since the more melting occurs at the corner because of the emission of the laser light 13, it is easy to form the vertex 5 (or the ridge line 5-2) of the interface 4 having a larger angle than the original angle of the corner 9, the original angle being "equal to or larger than 90 degrees and equal to or smaller than 120 degrees".

In the present embodiment, the plurality of stairs 10 are formed, and the plurality of stair height differences are generated. Therefore, when the height difference is large, the laser light 13 is out of focus, and there is a risk of failure to sufficiently heat a part of the base member 1. However, when the values of the length L1 and the length L2 are adjusted as described above, even if the laser light 13 is slightly out of focus in the spot diameter of the laser light 13, the base member 1 can be sufficiently heated. Therefore, the base member 1 and the powder material 14 can be melted in the spot diameter of the laser light 13.

In the present embodiment, the explanation has been made in a case in which the emission direction of the laser light 13 is parallel to a gravity direction (a direction along the Z direction or a direction perpendicular to the uppermost surface 80). However, as the emission direction of the laser light 13, the laser light can be emitted in a direction that tilts by a predetermined angle from the gravity direction. Since the falling down phenomena based on gravity is utilized for the supply of the powder material, note that it is necessary to alter the laser-light emission apparatus so that the emission direction of the laser light and the supply direction of the powder material are different from each other. Thus, when the mold member 20A is formed, it is preferable to orient the uppermost surface 80 of the mold member 20A to be perpendicular to the gravity direction and orient the emission direction of the laser light 13 to be parallel to the gravity direction as much as possible.

Figure 8:
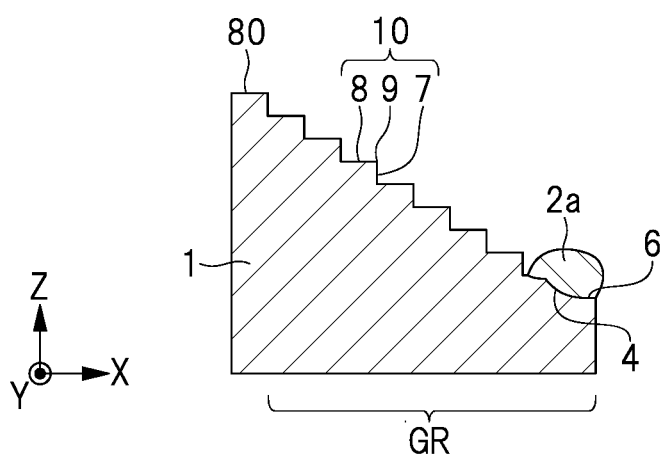
FIG. 8 is a cross-sectional view showing a manufacturing step continued from FIG. 7.

FIG. 8 shows a state observed after the emission of the laser light 13 explained in FIG. 7.

The base member 1 and the powder material 14 are melted by the laser light 13, and the scanning with the laser light 13 is made to a different region, and then, a weld object (referred to as bead in the LMD method often) "2a" containing the material of the base material 1 and the material of the powder material 14 is formed (built up and welded) on the base member 1. In the manner, the shape of the stair 10 before the melting changes. FIG. 8 shows the boundary between the base member 1 and the weld object 2a as the interface 4 of the region where the weld object 2a is formed. Note that a width of the weld object is almost equal to the spot diameter of the laser light.

Figure 9:
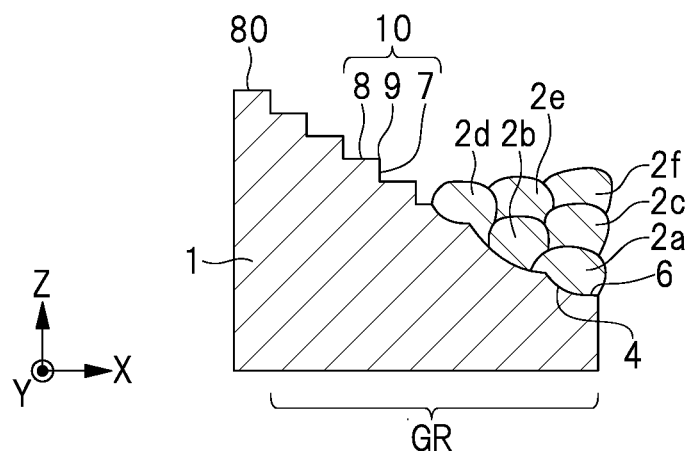
FIG. 9 is a cross-sectional view showing a manufacturing step continued from FIG. 8.

FIG. 9 shows a state observed after repetition of the step of FIG. 7 and the step of FIG. 8.

As shown in FIG. 9, weld objects 2b to 2f are sequentially formed by the same method as that of the step of forming the weld object 2a. Regarding the weld objects 2a to 2f, the weld object 2a, the weld object 2b, the weld object 2c, the weld object 2d, the weld object 2e and the weld object 2f are formed in this order by change of respective emission positions of the laser light 13. In other words, as described with reference to FIG. 7, the laser light is emitted so as to lay on the bottom surface 6 of the base member 1 and the upper surface 8 that is right above the bottom surface while the corner 9 is included inside the spot diameter of the laser light 13. When the powder material 14 is supplied into the spot diameter at the same time as the light emission, the weld object 2a is formed on a first upper surface of the base member 1. Then, the laser light is emitted so as to lay on the first weld object 2a and a next upper surface 8 while a next corner 9 is included inside the spot diameter of the laser light. When the powder material 14 is supplied into the spot diameter at the same time as the light emission, the weld object 2b that is in contact with a surface of the weld object 2a is formed on a second upper surface of the base member 1. Next, when the powder material 14 is supplied into the spot diameter of the laser light while the laser light is emitted into the spot diameter of the laser light so as to lay on the weld object 2a and the weld object 2b, the weld object 2c that is in contact with surfaces of the weld object 2a and the weld object 2b is formed. Subsequently, the weld objects 2d, 2e and 2f are formed. As described above, in the formation of the weld object near the stair, as shown in the weld object 2a and the weld object 2b in the drawing, a feature of the manufacturing method of the present invention is also to include a step of forming a next weld object that is in contact with both an already-formed weld object and a stair surface including the corner 9 of the base member 1 (in contact with the interface 4 in the case of the position after the formation of the weld object). In this manner, the occurrence of the gap near the interface between the weld objects can be avoided.

In this case, for example, the weld object 2c is formed by melting the weld object 2a and the powder material 14. In other words, when the powder material 14 is supplied into the spot diameter of the laser light 13 while the laser light 13 is emitted to the weld object 2a, the weld object 2c is formed on the weld object 2a. Therefore, since the weld object 2c is made of the material contained in the weld object 2a and the material contained in the powder material 14, a content ratio (simply referred to as ratio in some cases below) of the powder material 14 (cermet) contained in the weld object 2c is larger than a ratio of the powder material 14 (cermet) contained in the weld object 2a. In other words, a weld object formed in an upper layer has a higher ratio of the cermet that is the powder material 14 than that of a weld object formed in a lower layer.

Figure 10:
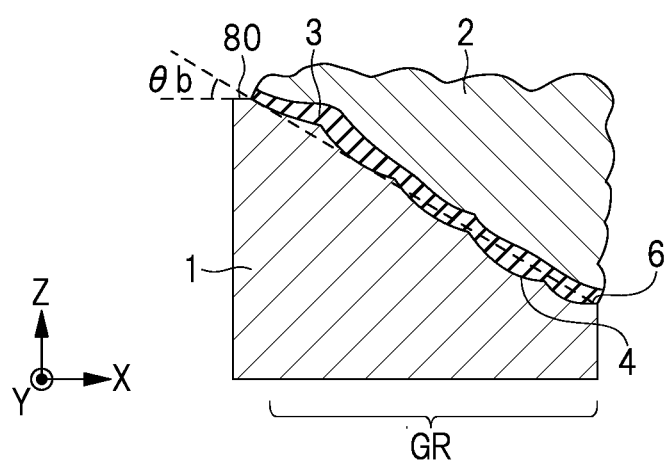
FIG. 10 is a cross-sectional view showing a manufacturing step continued from FIG. 9.

FIG. 10 shows a state in which the dent portion GR is filled with the sequentially-formed weld objects such as the weld objects 2a to 2f of FIG. 9. In FIG. 10, a group of these weld objects is shown as the shaped article (second metallic region) 2. The mix region 3 is a region where the metal contained as the material of the base member 1 and the metal contained as the material of the powder material 14 are mixed. The mix region 3 is a part of the shaped article 2 as well as a region in contact with the base member 1. However, in the present embodiment, the shaped article 2 and the mix region are separately illustrated in order to easily understand the invention.

As a point in the shaped article 2 is farther from the mix region 3, the ratio of the powder material 14 at the point is larger than the ratio of the material contained in the base member 1. The ratio of the powder material 14 near the surface of the shaped article 2 is almost 100%.

All the shapes of the plurality of stairs 10 change after the formation of the shaped article 2, and the boundary between the base member 1 and the mix region 3 becomes the interface 4. In the cross-sectional view, the interface 4 is represented by a line made of a plurality of curved lines. This line having the curved lines substantially extends toward the uppermost surface 80. When the ratio of "length L1/length L2" of each shape of the stairs 10 is appropriately adjusted as described above, the melting without the occurrence of the gap or the crack is possible.

Here, the ratio of "length L1/length L2" has been adjusted to be equal to or smaller than 0.6. In addition, in order to form the mold member 20A, the uppermost surface 80 of the mold member 20A has been adjusted to be perpendicular to the gravity direction, and the emission direction of the laser light 13 has been adjusted to be parallel to the gravity direction as much as possible. In the manner, in the cross-sectional view, an angle "θb" made by a virtual straight line and the uppermost surface 80 can be an index, the virtual straight line representing average tilt of a line configuring the interface 4 extending from the uppermost surface 80 of the base member 1 (corresponding to the uppermost surface 80 of the mold member 20A) out of the dent portion GR to the bottom surface 6 of the dent portion GR. In the present embodiment, this angle is preferably equal to or smaller than 50 degrees corresponding to 1.2 in the above-described "L1/L2" ratio. Particularly, this angle is preferably kept to be equal to or smaller than 31 degrees corresponding to 0.6 in the ratio.

Figure 19:
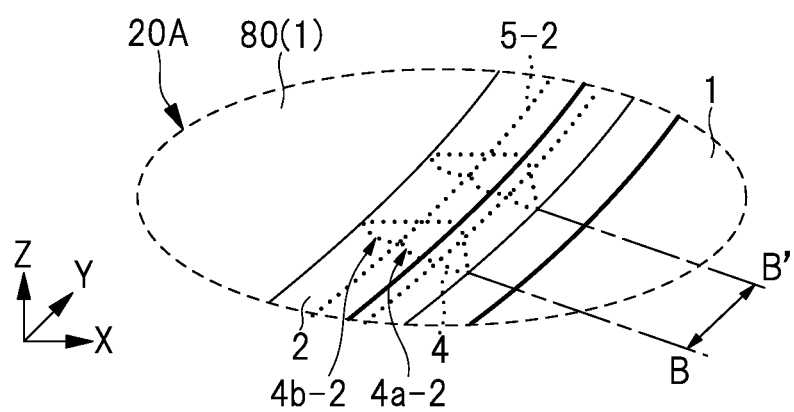
FIG. 19 is a perspective view showing an enlarged principal part of the mold of the fifth embodiment.

In this case, characteristics of a cross section targeted for the cross-sectional view are checked in more details when the cross section is defined to be perpendicular to the Y direction of FIG. 4 (in other words, an extending direction of the corner 9 of the stair 10), defined to be perpendicular to the ridge line 5-2 of FIGS. 3 and 19, or defined to be perpendicular to a corner straight line described later. However, even if the cross section is defined to have an angle that is slightly different from these angle definitions, the above-described characteristics can be checked. And, if figure characteristics are observed in the member 20 or an object including the member 20 extending in almost the same direction as the extending direction of the corner 9 that disappears after the formation of the member 20, then, the cross section may be defined on the basis of the figure characteristics. For example, in the female type of FIG. 2, the extending direction of the corner 9 is prepared to be the same as an extending direction of a body of the ladle in some cases. In this case, the extending direction of the ladle may be regarded as the above-described "body figure characteristics", and the cross section may be defined at a right angle (or substantially right angle) to the extending direction of the body of the ladle. Note that the cross section targeted for the cross-sectional view may be defined by a different basis.

The line configuring the interface 4 has a vertex bending toward the mix region 3 at a specific portion, and an angle "θc" made by tangent lines of two curved lines crossing at this vertex in a region of the base member 1 is preferably equal to or larger than 70 degrees. The characteristics of such a vertex having a right angle or an obtuse angle will be explained in detail later with reference to FIG. 12 or others.

FIG. 11 is a perspective view showing a manufacturing step continued from FIG. 10 as well as a perspective view showing a structure of the mold member 20A of the present embodiment.

As shown in FIG. 11, an upper surface and a side surface of the shaped article 2 are flattened by cutting or grinding the shaped article 2 that is formed out of the dent portion GR in FIG. 10. In the present embodiment, note that the case of the flat upper and side surfaces of the shaped article 2 is exemplified. However, the upper surface and the side surface of the shaped article 2 can be machined to have a desirable shape. For example, the upper surface of the shaped article 2 may be a curved surface protruding out of the base member 1 in the Z direction, or the side surface of the shaped article 2 may be a curved surface protruding out of the base member 1 in the X direction. The above-described manner manufactures the mold member 20A having the shaped article 2 that is built up and welded on the base member 1.

The mold member 20 of the present embodiment is a dissimilar metallic joint member formed by welding two or more types of metals. The mold 100 has such a problem that a specific portion is susceptible to wear or damage. For example, as shown in FIG. 2, a portion having the mold member 20A formed in the mold 100 is the shoulder of the cutout of the base member 1, and a large load is applied to such a portion at the time of press shaping. It is effective to reinforce such a portion by using a more strength material than that of the base member 1.

In the mold member 20A, the shaped article 2 is built up and welded on the dent portion GR of the base member 1. As a point in the shaped article 2 is closer to the surface of the shaped article 2, the ratio of the cermet that is the material contained in the powder material 14 at this point is larger than the ratio of the material contained in the base member 1. The ratio of the material contained in the powder material 14 near the surface of the shaped article 2 is almost 100%. In other words, in the shaped article 2, the ratio of the powder material 14 at a region farther than the mix region 3 from the base member 1 is larger than the ratio of the powder material 14 at the mix region 3. In other words, the material contained in the shaped article 2 has higher strength than that of the material contained in the base member 1. Therefore, when the mold member 20A according to the present embodiment is used, the problems such as the wear or the damage at the specific portion of the mold 100 can be suppressed.

Alternatively, the mold 100 including the mold member 20A is not made of the dissimilar metallic joint member, and it is considerable that all the materials configuring the mold 100 are cermet (that is the material contained in the powder material 14) to enhance the hardness of the entire mold 100. However, in this case, a manufacturing cost of the mold 100 significantly increases. As described in the present embodiment, an inexpensive base member 1 is used as a base while only the specific position is reinforced by an expensive shaped article 2, so that the increase in the manufacturing cost can be suppressed.

It is also considerable that the shaped article 2 filled in the dent portion GR of the mold member 20A is formed by using not the LMD method of the present embodiment but a CVD (Chemical Vapor Deposition) method, a sputtering method that is one of PVD (Physical Vapor Deposition) methods or others. However, by the CVD method or the sputtering method, while a reinforcing layer having a thickness of several micrometers can be formed, it is practically difficult to form the shaped article 2 having a thickness of several millimeters or more as described in the present embodiment. In consideration of the adhesiveness between the base member 1 and the shaped article 2, the CVD method or the sputtering method is basically a method of depositing a reinforcing material on the surface of the base member 1, and the adhesiveness between this reinforcing material and the base member 1 is not so high. By the buildup welding technique based on the LMD method in the present embodiment, the adhesiveness between the base member 1 and the shaped article 2 can be more improved than that based on the CVD method or the sputtering method.

Figure 12:
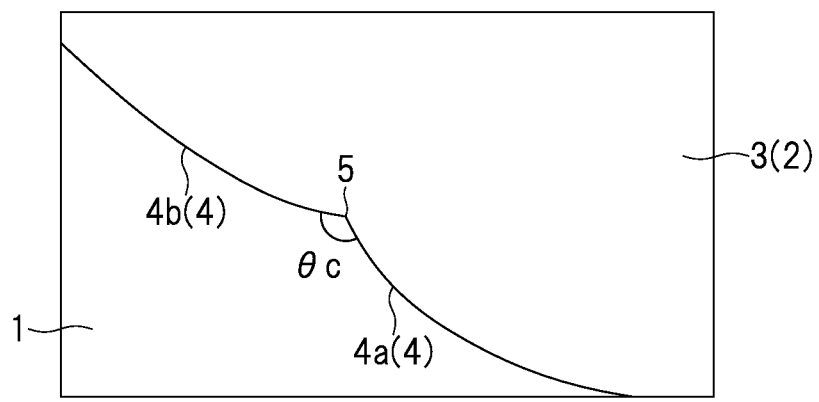
FIG. 12 is a cross-sectional view showing an enlarged principal part of the mold member of the first embodiment.

FIG. 12 is a part of a cross-sectional view taken along a line A-A shown in FIG. 11 as well as a cross-sectional view of an enlarged principal part of the mold member 20A. Note that FIG. 12 is the cross-sectional view while hatching is omitted in order to easily understand the drawing.

As shown in FIG. 12, in the cross-sectional view, the interface 4 that is the boundary between the base member 1 and the mix region 3 is represented by a line having the curved line 4a and the curved line 4b. At the vertex 5 that is the cross point of the curved lines 4a and 4b, the angle θc made by the curved lines 4a and 4b in a region of the base member 1 is better to be the right angle or the obtuse angle. In other words, the angle θc is equal to or larger than 90 degrees and smaller than 180 degrees.

In other words, in the cross-sectional view, the interface 4 that is the boundary between the base member 1 (first metallic region) and the mix region 3 is represented by a line having an arc-shaped first curved line 4a that protrudes toward the base member 1 and an arc-shaped second curved line 4b that protrudes toward the base member 1. At the cross point (vertex 5) of the first curved line 4a and the second curved line 4b, the angle θc made by a tangent line of the first curved line 4a and a tangent line of the second curved line 4b in the region of the base member 1 is more better to be the right angle or the obtuse angle. In other words, the angle θc is equal to or larger than 90 degrees and smaller than 180 degrees.

Here, the method that is explained in the present embodiment forms the melt pool 15 while displacing the laser light mainly in a depth (or front) direction of the cross-sectional view, and therefore, each of the curved line 4a and the curved line 4b becomes a curved (for example, arc, elliptic arc, or arc-shaped such as a part of trochoid curve) line protruding toward the base member 1. However, the base member 1 and the powder material 14 may be partially inhomogeneous in some cases, and therefore, the curved line 4a and the curved line 4b may include a section not protruding toward the base member.

In the LMD method, the weld object 2 of FIG. 8 is formed to be not a dot but a line made of the continuous weld objects. In the example of FIG. 8, the continuous weld objects are linearly formed in parallel to the Y direction (in other words, in parallel to the line of the corner 9 of the stair 10 toward the depth side). Therefore, in a stereoscopic view as shown in FIGS. 3, 4 and 11, a substantially-straight peripheral portion of the corner 9 of the stair 10 has a region where the same-shaped cross-sectional views of FIG. 12 continue in the tangent-line direction of the corner 9 (the depth direction of FIG. 12 or the Y direction of FIGS. 3,4 and 11). Note that the substantially-straight portion of the line of the corner 9 is referred to as "corner straight line" in the following explanation in some cases. For example, when the present technique is utilized for a curved portion as shown in FIG. 19 explained later, the corner 9 of the stair 10 is also curved although illustration is omitted. However, in attention paid to a portion between B and B' in FIG. 19, the curve of the corner 9 is substantially straight, and therefore, the portion can be regarded as the "corner straight line".

Back to FIGS. 3 and 8 for the explanation. In this peripheral portion, the curved line 4a becomes a curved plane 4a-2 that is straight in the corner straight line direction, and the curved line 4b becomes a curved plane 4b-2 that is straight in the corner straight line direction. The vertex 5 is straight in the corner straight line direction as well as being a line (in other words, the ridge line 5-2) at which the curved plane 4a-2 and the curved plane 4b-2 cross each other. In FIG. 12, a line formed by extending the vertex 5 in the Y direction (a drawing sheet plane direction) becomes the ridge line 5-2. Therefore, on the ridge line, the cross angle θc (aperture angle) made by the curved plane 4a-2 and the curved plane 4b-2 in the region of the base member 1 is also preferably equal to or larger than 90 degrees and smaller than 180 degrees. A lower limit angle is better to be the obtuse angle, and is preferably equal to or larger than 120 degrees.

In FIG. 3, each of the ridge line 5-2, the curved plane 4a-2 and the curved plane 4b-2 is represented by a dotted line. Note that FIG. 3 does not show the corner straight line since the corner straight line disappears after the member formation. When the LMD method is utilized, a formation speed of the weld object 2a can be increased. Therefore, the longer the corner straight line of the corner 9 is, the larger the formation speed of the weld object 2a is. Thus, when the shaped article 2 has a shape including a longitudinal direction and a lateral direction, the longitudinal direction and the ridge-line direction may be the same as each other.

The characteristics of the cross-sectional view will be explained again. As described above, when the LMD is utilized, the formation speed of the weld object 2a is improved. Therefore, the longer the straight line of the corner 9 is, the larger the formation speed of the weld object 2a on the basis of the LMD is. Therefore, when the shaped article 2 has the shape including the longitudinal direction and the lateral direction, the straight line of the corner 9 may be formed in parallel to the longitudinal direction. In this case, the explained characteristics of FIGS. 6 to 10 and 12 in which the cross section is defined to be at the right angle to the corner straight line can be also regarded as characteristics of a cross section that is defined to be perpendicular to the longitudinal direction of the shaped article.

As explained above with reference to FIG. 24, in the second comparative example, the angle θd made by the curved line 4a and the curved line 4b in the region of the base member 1 is the acute angle. Therefore, the residual stress that is generated in the mix region 3 easily concentrates on the vertex 5, and there is a problem of easiness in the occurrence of the crack starting from the vertex 5.

On the other hand, in the present embodiment, the angle θc made by the curved line 4a and the curved line 4b in the region of the base member 1 is nearly the right angle or the obtuse angle, and therefore, the concentration of the residual stress that is generated in the mix region 3 onto the vertex 5 can be moderated. Therefore, the problem of the occurrence of the crack can be suppressed.

Although FIG. 12 illustrates only one vertex 5, the interface 4 in the cross-sectional view has a plurality of vertices 5 in some cases. In the present embodiment, at all the vertices 5, the angle θc made by the curved line 4a and the curved line 4b in the region of the base member 1 is preferably nearly the right angle or the obtuse angle As described above, by the utilization of the technique of the present embodiment, the joint force of the boundary surface on which the dissimilar metals such as the base member 1 and the shaped article 2 can be improved, and the highly-reliable mold member 20A without the gap and the crack can be formed, and therefore, the strength of the entire mold 100 can be enhanced.

Second Embodiment

Figure 13:
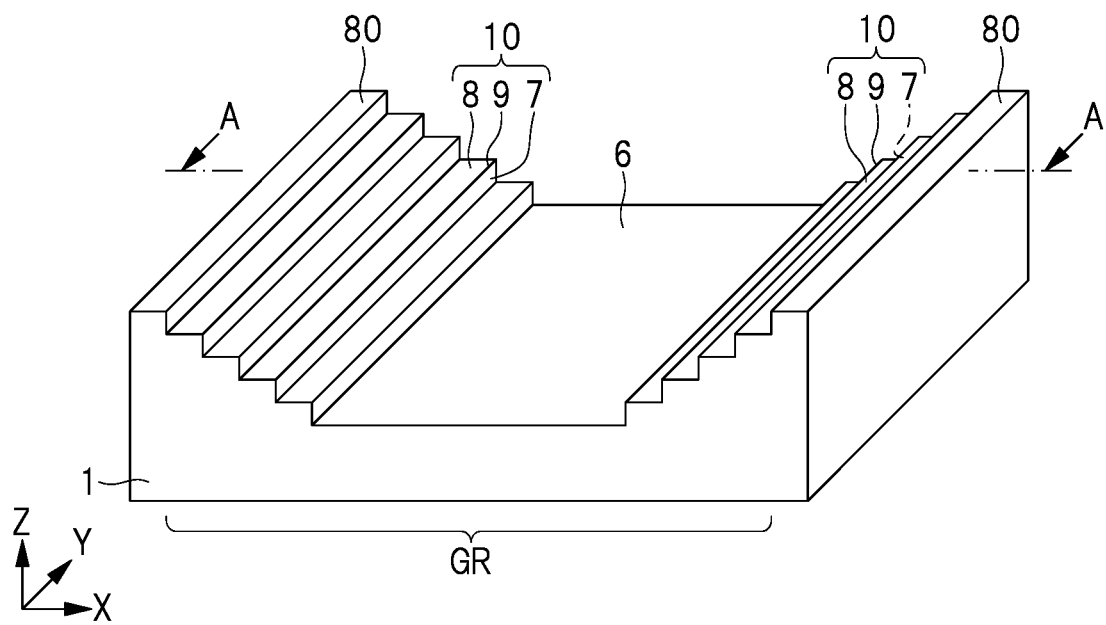
FIG. 13 is a perspective view showing a base member of a second embodiment.
Figure 14:
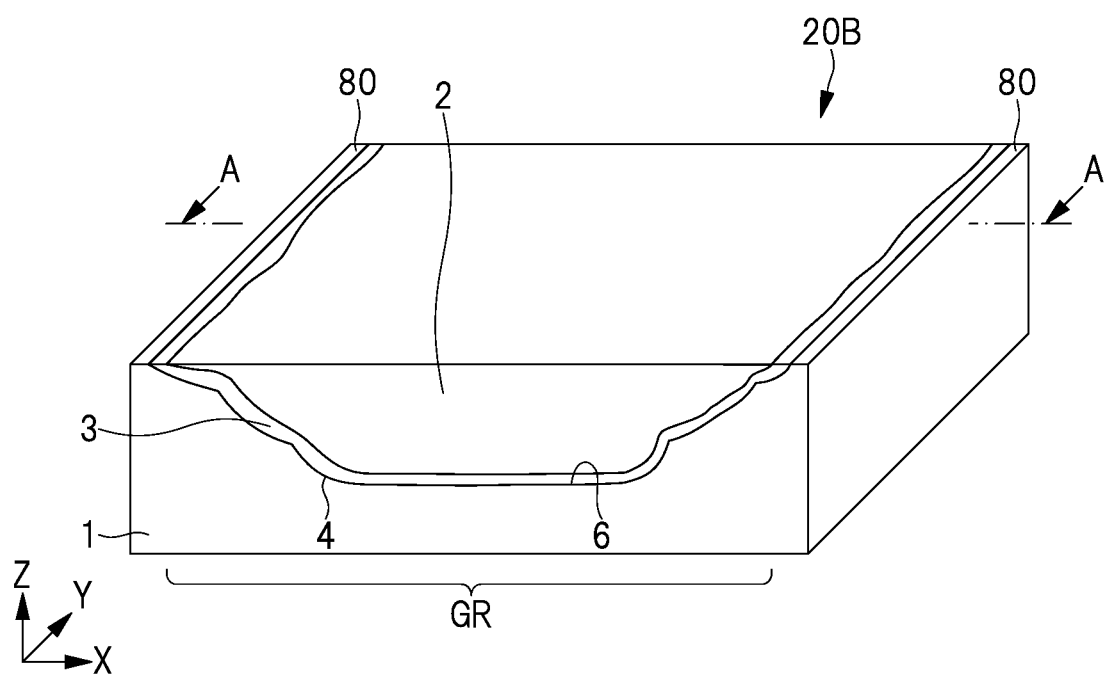
FIG. 14 is a perspective view showing a mold member of the second embodiment.

A mold member 20B of a second embodiment will be explained below with reference to FIGS. 13 and 14. FIG. 13 is a perspective view showing a structure of the base member 1 obtained before completion of the mold member 20B. FIG. 14 is a perspective view showing a structure of the mold member 20A. Note that differences from the first embodiment will be mainly explained in the following explanation.

In the first embodiment, the plurality of stairs 10 are formed inside the dent portion GR of the base member 1, and the mold member 20A is structured so as to expose not only the upper surface of the shaped article 2 but also one side surface of the shaped article 2.

In the second embodiment, as shown in FIG. 13, a pair of stairs 10 are formed inside the dent portion GR of the base member 1 so as to face each other in the X direction. Therefore, as shown in FIG. 14, in the mold member 20B, the shaped article 2 is welded on the base member 1 so that the shaped article 2 is embedded into the dent portion GR. Therefore, both side surfaces (interface 4) of the shaped article 2 are covered with the base member 1, and only the upper surface of the shaped article 2 is exposed.

It is effective to use the mold member 20A of the first embodiment for the shoulder of the key-hole shaped cutout of the mold 100 shown in FIG. 2. However, the mold member 20B of the second embodiment is used in a different region from the shoulder of the cutout. The mold member 20B is more difficult to cause peeling off of the shaped article 2 from the base member 1 than the mold member 20A since both side surfaces of the shaped article 2 are covered with the base member 1. In the manner, the mold member 20B is a member that is effective for improvement of the hardness of the upper surface of the mold 100.

Third Embodiment

Figure 15:
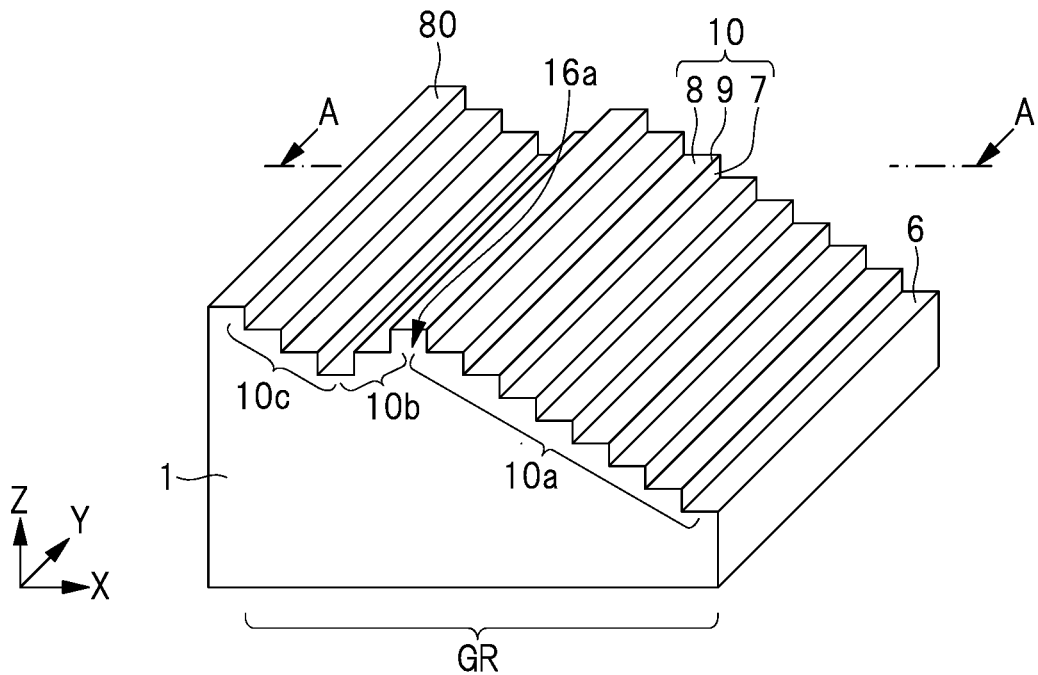
FIG. 15 is a perspective view showing a base member of a third embodiment.
Figure 16:
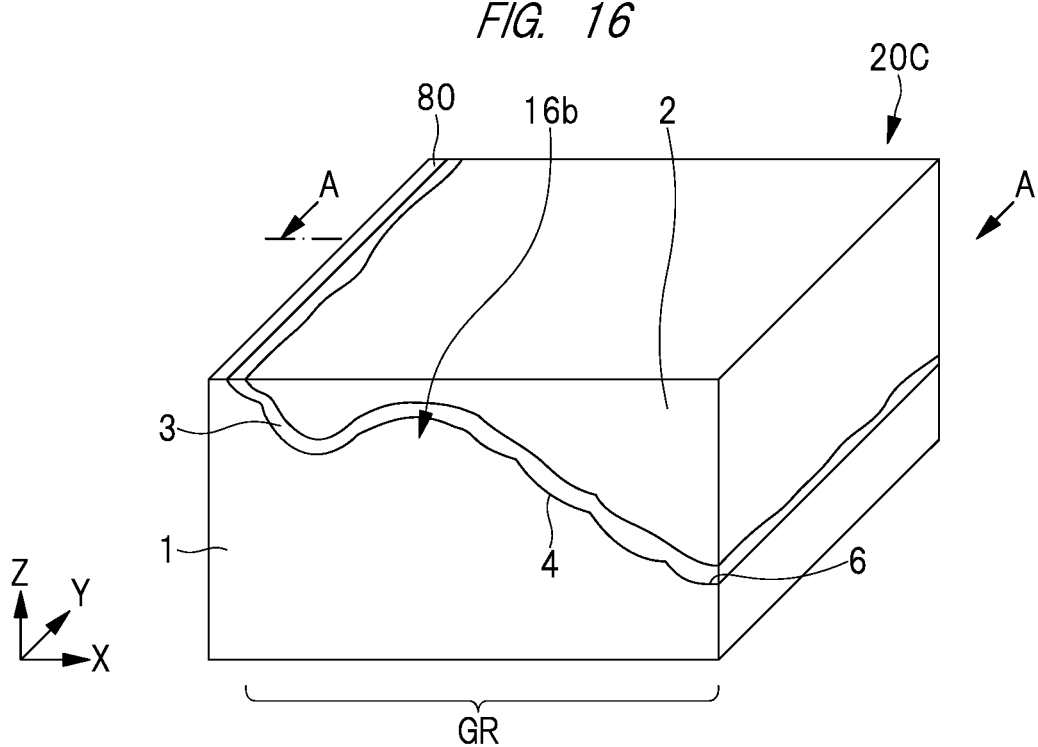
FIG. 16 is a perspective view showing a mold member of the third embodiment.

A mold member 20C of a third embodiment will be explained below with reference to FIGS. 15 and 16. FIG. 15 is a perspective view showing a structure of the base member 1 obtained before the mold member 20C is completed, and FIG. 16 is a perspective view showing a structure of the mold member 20C. Note that differences from the first embodiment will be mainly explained in the following explanation.

In the first embodiment, the plurality of stairs 10 that are formed in the base member 1 consistently rise from the bottom surface 6 of the dent portion GR to the uppermost surface 80 of the base member 1.

In the third embodiment, as shown in FIG. 15, the plurality of stairs 10 that are formed in the base member 1 include a rising region 10a, a falling region 10b connected to the rising region 10a, and a rising region 10c connected to the falling region 10b. In other words, a protruding region 16a made of the rising region 10a and the falling region 10b is formed in the base member 1.

As shown in FIG. 16, after the shaped article 2 is welded on the base member 1, the base member 1 has a protrusion 16b at which a shape of the protruding region 16a changes, the protrusion being in the middle from the bottom surface 6 of the dent portion GR to the uppermost surface 80 of the base member 1 out of the dent portion GR.

The shaped article 2 is also formed in a dent between the protrusion 16b and the uppermost surface 80 of the base member 1. Therefore, the mold member 20C has a strong structure for shear force in the X direction. In other words, since the base member 1 and the shaped article 2 are welded, the joint force between the base member 1 and the shaped article 2 is high. However, when the strong shear force in the X direction is applied to the shaped article 2, the first embodiment has a risk of separation of the shaped article 2 from the base member 1. On the other hand, in the third embodiment, since the base member 1 has the protrusion 16b, the risk of the separation of the shaped article 2 can be suppressed.

And, two or more such protrusions 16a and 16b may be formed. This case can provide the mold having a stronger structure for the shear force in the X direction.

The technique disclosed in the third embodiment can be also applied to the mold member 20B of the second embodiment.

Fourth Embodiment

Figure 17:
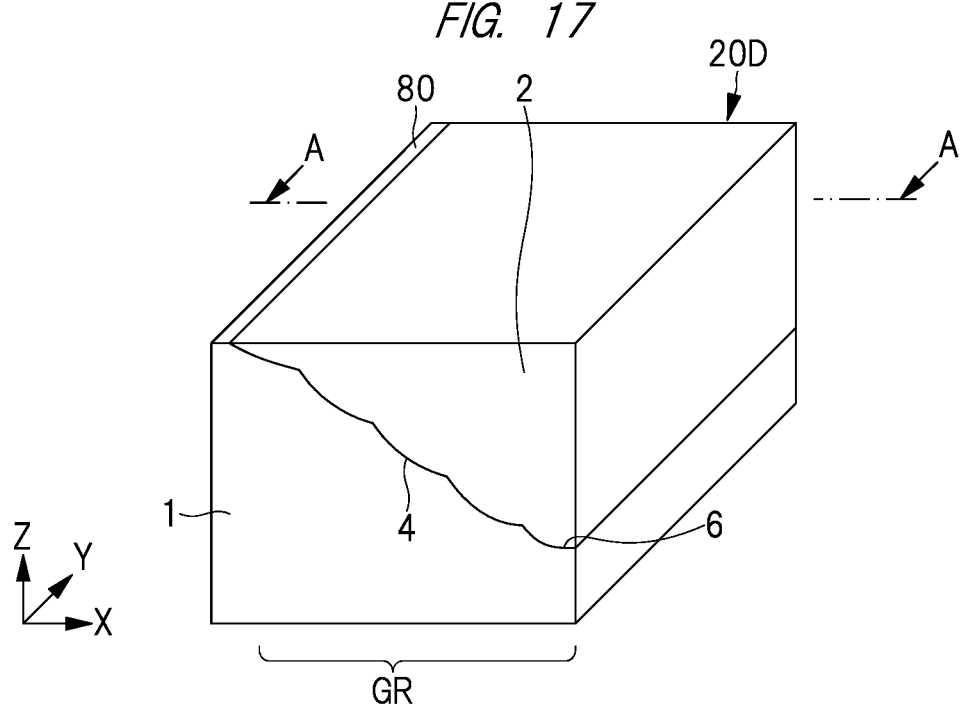
FIG. 17 is a perspective view showing a mold member of a fourth embodiment.

A mold member 20D of a fourth embodiment will be explained below with reference to FIG. 17. FIG. 17 is a perspective view showing a structure of the mold member 20D. Note that differences from the first embodiment will be mainly explained in the following explanation.

In the first embodiment, when the shaped article 2 is welded on the base member 1, the mix region 3 is formed in the region of the shaped article 2, the region being in contact with the base member 1. In the fourth embodiment, although the shaped article 2 is built up and welded on the base member 1, the mix region 3 is not included in the shaped article 2. Each material of the base member 1 and the shaped article 2 explained later is exemplified for a combination causing phase separation that is observed in a combination case of, for example, pure copper and stainless steel.

Also in the fourth embodiment, the base member 1 shown in FIG. 4 of the first embodiment is used, and the manufacturing steps explained with reference to FIGS. 5 to 11 are performed. However, the powder material 14 used in the fourth embodiment is powder pure copper. Therefore, in the step of FIG. 7, the laser light 13 is emitted to the base member 1 made of the stainless steel such as SUS 316L while the powder material 14 made of the pure copper is supplied. Then, the weld objects 2a to 2f made of the pure copper are sequentially welded on the base member 1, and the shaped article 2 made of these weld objects is formed. A pure grade of the pure copper is preferably equal to or higher than 99.95%, and is more preferably equal to or higher than 6N (99.9999%).

In the fourth embodiment, when the above-described materials are used for the base member 1 and the powder material 14, the shaped article 2 is built up and welded on the base member 1. However, at the time of this shaping, the phase separation is observed inside the mix region 3. Therefore, the interface 4 of the fourth embodiment is the boundary surface between the base member 1 made of the stainless steel and the shaped article 2 made of the pure copper.

Also in the fourth embodiment, as similar to FIG. 12 of the first embodiment, the interface 4 in the cross-sectional view is represented by the line having the curved line 4a and the curved line 4b, and the angle θc made by the curved lines 4a and 4b in the region of the base member 1 becomes the right angle or the obtuse angle. The angle θc is preferably equal to or larger than 90 degrees and smaller than 180 degrees. An upper limit angle is better to be an obtuse angle, and is preferably equal to or larger than 120 degrees. Therefore, by the welding using the laser light 13, the concentration of the residual stress generated in the shaped article 2 made of the pure copper onto the vertex 5 can be moderated. Thus, the problem of the occurrence of the crack in the shaped article 2 can be suppressed.

The base member 1 for use in the fourth embodiment may be the base member 1 disclosed in the second embodiment or the third embodiment. In this case, the mold member 20D of the fourth embodiment can provide the same effect as that of the second embodiment or the third embodiment. Each material of the base member 1 and the shaped article 2 may be a different material as long as the material combination generates the phase separation.

Fifth Embodiment

Figure 18:
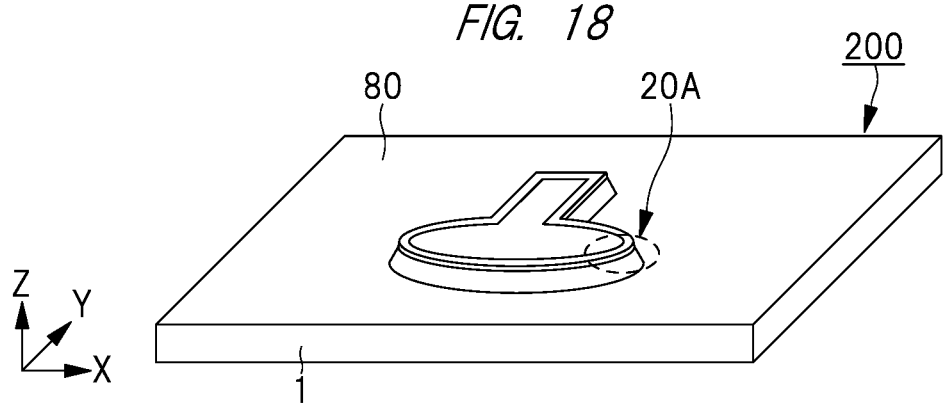
FIG. 18 is a perspective view showing a mold of a fifth embodiment.

A mold 200 of a fifth embodiment will be explained below with reference to FIGS. 18 and 19. FIG. 18 is a perspective view showing the mold 200 and the mold member 20A of the present embodiment, and FIG. 19 is a perspective view showing a portion illustrated with a broken line in FIG. 18 as well as an enlarged principal part of the mold 200. In FIG. 19, for convenience, a shape of the mold member 20A is illustrated with a dotted line. Note that differences from the first embodiment will be mainly explained in the following explanation.

In the first embodiment, the female-type mold 100 is exemplified. However, the shape of the mold is not limited to this. As shown in FIG. 18, the mold 200 may have a male-type shape. In other words, the shape of the mold 200 has a swelling portion in which a part of the base member 1 is swelled. As shown in FIGS. 18 and 19, in the fifth embodiment, the mold member 20A is utilized for a shoulder of the swelling portion. In the manner, the mold 200 can also suppress the problem of the wear, the damage or others of the specific portion.

As shown in FIG. 18, in the present embodiment, the shaped article 2 is curved. Therefore, a curved stair (the stairs are also regarded as being curved) is formed on the shoulder in a whole image (although illustration is omitted). However, since the above-described corner straight line can be secured when a specific region is enlarged to be viewed as shown in the B-B' section of FIG. 19, it can be also said that a portion near the corner straight line has the above-described characteristics of the ridge line. In other words, when the portion near the corner straight line is regarded as a member, the mole has the above-described member characteristics. When the cross section is defined to be perpendicular to a tangent line at a predetermined point of the ridge line 5-2, it can be also said that the mold has the characteristics of the cross-sectional view explained with reference to FIG. 12 and others. For not only the male-type mold 100 but also the member 20 explained in each embodiment, it can be said that, for example, the angle θc is preferably equal to or larger than 70 degrees and smaller than 180 degrees, and is more preferably equal to or larger than 90 degrees. The average tilt angle θd made by the interface with reference to the uppermost surface of the member 20 is equal to or smaller than 50 degrees.

And, the mold members 20B to 20D that are explained in the second to fourth embodiment also can be appropriately utilized for a desirable portion of the male-type mold 200. (Estimation)

Manufacturing results of the members using the above-explained techniques will be described. For the manufacturing, the following <Condition 1> to <Condition 9> were used.

<Condition 1> Powder-Material Supply Amount: 2.0 g/min.

<Condition 2> Powder Material: Cemented Carbide Alloy (Tungsten Carbide of 60% and Pure Cobalt of 40%), Particle Diameter of 30 to 150 μm <Condition 3> Base-Member Material: Inconel 718 ("Inconel" is a registered trade mark)

<Condition 4> Base-Member Shape 1: FIG. 22 (having side surfaces 70 on both a left tilted surface and a right tilted surface, and having a height of 6 mm and a bottom length of 10 mm)

<Condition 5> Base-Member Shape 2: FIG. 13 (having the number of stairs 10 of 10, each stair 10 having the same shape having a length L1=0.6 mm and a length L2=1.0 mm, and the angle θa of the corner 9 of 90 degrees)

In this case, the Z direction of the base member is set so as to be parallel to the gravity direction and the emission direction of the laser light.

<Condition 6> Track Displacement Pitch of Laser Head 12: Displacement by 1.0 mm in parallel to X direction (in other words, Displacement by L2 in perpendicular to Elongation Direction of Corner 9 and parallel to Upper Surface 8 of Stair 10) and Displacement by 0.6 mm in parallel to Z direction (in other words, Displacement by L1 in perpendicular to Tangent-Line Direction of Corner 9 and parallel to Side Surface 7 of Stair 10). Each corner 9 has the same distance to the laser head and the same emission direction in order to aim at reducing the variation.

<Condition 7> Laser Output: 1200 W (Output from Diode Laser)

<Condition 8> Laser Spot Diameter: 3.0 mm (that is larger than L2 so that the occurrence of the gap between the molten objects is avoided because of the interaction with the displacement pitch of the laser head track)

<Condition 9> Laser Feeding Speed: 100 mm/min.

In this case, the manufacturing methods explained in the above-described <Condition 1> to <Condition 9> and FIGS. 5 to 10 and others can be said as follows. The first weld object is formed first on the first surface of the base member 1 by the supply of the powder material into the spot diameter of the laser light while the laser light is emitted to the base member 1 to trace the first track, and then, the second weld object is formed on the surface of the first weld object and the second surface of the base member adjacent to the first surface by the supply of the powder material into the spot diameter of the laser light while the laser light is emitted to the first weld object 1 to trace the second track.

In the explanation with reference to FIG. 9 as one example, when the first weld object is the weld object 2a, the second weld object is the weld object 2b. The emission of the laser light along the first and second tracks described here is achieved by not changing the laser head 12 for each track but taking the above-described displacement mechanism using the same laser head 12 so as to change a relative position between the laser head 12 and the base member 1. Regarding the explanation for the <Condition 6>, it can be also said that the second track includes a track made by the displacement of the first track by (i) L1 in the direction that is parallel to the side surface as well as being perpendicular to the elongation direction of the corner (in the example of FIG. 9, the direction is parallel to the Z direction) and by (ii) L2 in the direction that is parallel to the upper surface as well as being perpendicular to the elongation direction of the corner (in the example of FIG. 9, the direction is parallel to the X direction). In this case, as explained in the <Condition 5>, since the Z direction is parallel to the emission direction of the laser light while the X direction is perpendicular to the emission direction of the laser light, it can be also said that the length L1 of the side surface 7 in the Z direction is the length L1 of the side surface 7 in parallel to the emission direction of the laser light. Similarly, it can be also said that the length L2 of the upper surface 8 in the X direction is the length L2 of the upper surface 8 in perpendicular to the emission direction of the laser light.

The members were manufactured by the above-described <Condition 1> to <condition 9>, and the portion used to be the stair or the tilted surface was targeted for the shape measurement and the observation for the presence of the crack. Note that the shape measurement and the crack observation were made by cutting the manufactured member at the cross section in the Y direction and polishing the cut cross-sectional surface by a file (rasp) or a buff, and then, checking the surface by a microscope. FIG. 25 shows measurement results of the member having the tilted side surface 70. FIG. 26 shows measurement results of the member having the side surface 70 made of the plurality of stairs 10. In the base-member shape 1, the cracks occurred near two vertices 5, and one of the cracks overlapped the vertex 5, and thus, it was impossible to measure the angle θd itself of the vertex 5. Note that the maximum angle at the time of the occurrence of the crack was 57 degrees, and the crack did not occur at 70 degrees. Therefore, it can be said that the possibility of the occurrence of the crack is high when the angle is up to 60 degrees or so. In the base-member shape 2, the crack did not occur at the portion used to be the stair 10, the angle θc of the vertex 5 was 118 degrees at the minimum. Note that the occurrence of the gap was not observed in both the base-member shape 1 and the base-member shape 2. In base-member shape 2, although the number of stairs 10 is 10, the occurrence of the crack was not observed at the remaining three stairs 10. It is considerable that the angle θc of the vertex 5 is nearly 180 degrees as much as being hardly measured, and therefore, is not shown.

As results described above, in the evaluation on the angle of the vertex and the presence of the crack in the member, according to the measurements, it can be said that the possibility of the occurrence of the crack was reduced regardless of the manufacturing method when the angle of the vertex is equal to or larger than 70 degrees and smaller than 180 degrees. Incidentally, when the angle is verified at the time of quality check after the manufacturing of the member, the most simply available angle index (such as a small protractor) is 90 degrees, and secondly 45 degrees or 60 degrees. However, at 45 degrees, the crack is caused by the measurement. Therefore, even when the crack does not occur at the time of manufacturing, there is a risk of the occurrence of the crack at the time of application after that. The same goes for 60 degrees. Therefore, in a practical site, it is preferable to take 90 degrees as the index for the quality check to check whether the vertex angle of the member is equal to or larger than 90 degrees.

Next, as seen in the base-member shape 2, it has been explained that the vertex having the wider angle than the original angle of the corner 9, the original angle being "equal to or larger than 90 degrees and equal to or smaller than 120 degrees", is formed since at least one corner 9 is included inside the spot diameter of the laser light 13 in the present embodiment. Such characteristics were measured as the measurement results of the base-member shape 2, and therefore, it can be said that the manufacturing method that is explained in the embodiments achieves the joint force having the high strength. From the measurement results of the base-member shape 2, it can be said that the joint force having the high strength is achieved when the ratio of "length L1/length L2" is 0.6. When this ratio is equal to or smaller than 0.6, the laser emission conditions are more improved, and therefore, an idea for the achievement of the joint force having the higher strength is resulted from the measurement results.

(Variation)

In the foregoing, the invention made by the inventors of the present invention has been concretely described on the basis of the embodiments. However, the present invention is not limited to the foregoing embodiments, and various modifications can be made within the scope of the present invention. While single use of any one of the embodiments may be applied, combination use of one embodiment with the other may be also applied. It is considerable that the embodiments have the following variation.

In the above explanation, the mold member has been explained as one example of the member. However, another example of the member may be a part of a component such as machine parts or an accessory. As the part of the component, the member may be manufactured by using the same type of powder material but a different method (another manufacturing method) from the above-explained manufacturing method. The shaped article 2 that is manufactured by the above-explained manufacturing method and a shaped article that is manufactured by another manufacturing method may be in contact with each other. A boundary between the member of the component and a portion outside the member may have any shape.

The vertices 5 or the ridge lines 5-2, the number of which is the same as the number of the stairs 10 of the base member 1, may not be included in the interface 4. As one example of the curved line of the interface 4, the curved line having the center of curvature existing in a region of the shaped article 2 is used. However, the curved line may have a middle portion, the center of curvature of which exists in a region of the base member 1.

The member may be manufactured while different types of the powder materials are switched during the manufacturing of the member (for example, a first powder material is used for a region in contact with the interface 4 while a second powder material is used thereafter). When a result of the buildup welding of the material of the base member 1 and the second powder material is not good (meaning of "not good" includes not only failure in the welding itself but also high potential of the damage caused by difference in a physical value such as heat expansion coefficient between the materials), the first powder material having good affinity with both the materials may be used.

A region that is in contact with the interface 4 inside the base member 1 may be provided with a region made of a different material (such as nickel base alloy) from the main material (such as steel) of the base member 1. This is because the base member 1 is not always made of only a material having a favorable result on the welding with the powder material 14 when the existing component is improved. The above-described configuration may be applied as a countermeasure for the case without the favorable result on the welding between the main material of the base member 1 and the material of the powder material 14.

Although it is desirable that the angles θc of all the vertices 5 (or the aperture angles of the ridge lines 5-2) of the interface 4 are equal to or larger than 90 degrees and equal to or smaller than 180 degrees, they may always not meet the requirement. This is because another manufacturing method as described above is used in some cases. In addition, this is because such a configuration is still useful since the crack does not occur between the vertices 5 (or ridge lines 5-2) when each of these vertices 5 or ridge lines 5-2 that are adjacent to each other has the angle that is equal to or larger than 90 degrees and equal to or smaller than 180 degrees.

A material other than the cermet may be used as the second material (powder material 14). For example, a material such as stainless steel, nickel alloy, cobalt alloy, maraging steel and titanium alloy that is different from the material of the base member 1 may be used as the second material. As the first material (the material of the base member 1), not the Inconel 718 ("inconel" is the registered trade mark) but stainless steel or tool steel may be used, or a different metal may be used.

The lengths of the upper surfaces 8, the lengths of the side surfaces 7, or the angles θa of the plurality of stairs 10 may be different from one another. Alternatively, the lengths of the upper surface 8 and the side surface 7 of one stair 10 may be partially different.

Adjacent two tracks (such as the first track and the second track) of the laser head are not always completely the same as each other from an origin point to an end point in the displacement by the displacement pitch, and may be partially the same as each other. Such circumstances probably happen when a shaped article 2 having a complicated shape is formed.

A person who prepares the base member 1 including the plurality of stairs 10 and a person who forms the shaped article 2 on this base member 1 may be the same as or different from each other. In the different case, the person who forms the shaped article 2 performs a step of receiving the base member 1 including the plurality of stairs 10.

EXPLANATION OF REFERENCE CHARACTERS

1 . . . base member (first metallic region)
2 . . . shaped article (second metallic region)
2a to 2f . . . weld object
3 . . . mix region
4 . . . interface
4a, 4b . . . curved line
4a-2, 4b-2 . . . curved surface
5 . . . vertex
5-2 . . . ridge line
6 . . . bottom surface
7 . . . side surface
8 . . . upper surface
9 . . . corner
10 . . . stair
10a, 10c . . . rifting region
10b . . . falling region
11 . . . gap
12 . . . laser head
13 . . . laser light
14 . . . powder material
15 . . . melt pool
16a, 16b . . . protruding FIG. 25 shows measurement results of the member having the side surface 70 made of the plurality of stages 10. region
20A to 20E . . . mold member (dissimilar metallic joint member)
70 . . . side surface
80 . . . uppermost surface
100, 200 . . . mold
GR . . . groove (dent portion)
L1, L2 . . . length
θa to θd . . . angle

The invention claimed is:

1. A member comprising:
a first metallic region made of a first material;
a second metallic region made of a second material that is a different material from the first material; and
a mix region made of mixture of the first material and the second material, between the first metallic region and the second metallic region,
wherein, in a cross-sectional view,
an interface between the first metallic region and the mix region is represented by a line having a first curved line protruding toward the first metallic region and a second curved line protruding toward the first metallic region, and
an angle at a cross point of the first curved line and the second curved line is equal to or larger than 70 degrees and smaller than 180 degrees, the angle being made by a tangent line of the first curved line and a tangent line of the second curved line in a region of the first metallic region;
wherein a dent portion is formed in the first metallic region,
the second metallic region is formed inside the dent portion, and
the first metallic region is provided with a protrusion extending toward an upper surface of the dent portion, in the middle of a plane extending from a bottom surface of the dent portion to an upper surface of the first metallic region out of the dent portion.

2. The member according to claim 1,
wherein the angle is equal to or larger than 90 degrees and smaller than 180 degrees.

3. The member according to claim 1,
wherein the angle is equal to or larger than 90 degrees and smaller than 180 degrees, and
the second material is a material made of cermet.

4. The member according to claim 1,
wherein, inside the second metallic region, a content ratio of the second material in a region farther than the mix region from the first metallic region is larger than a content ratio of the second material in the mix region.

5. The member according to claim 1,
wherein the member is a mold member configuring a part of a mold.

6. A member comprising:
a first metallic region made of a first material; and
a second metallic region made of a second material that is a different material from the first material,
wherein, in a cross-sectional view,
an interface between the first metallic region and the second metallic region is represented by a line having a first curved line protruding toward the first metallic region and a second curved line protruding toward the first metallic region, and
an angle at a cross point of the first curved line and the second curved line is equal to or larger than 70 degrees and smaller than 180 degrees, the angle being made by a tangent line of the first curved line and a tangent line of the second curved line in a region of the first metallic region;

wherein a dent portion is formed in the first metallic region, the second metallic region is formed inside the dent portion, and the first metallic region is provided with a protrusion extending toward an upper surface of the dent portion, in the middle of a plane extending from a bottom surface of the dent portion to an upper surface of the first metallic region out of the dent portion.

7. The member according to claim 6,
wherein the angle is equal to or larger than 90 degrees and smaller than 180 degrees.

8. The member according to claim 6,
wherein the angle is equal to or larger than 90 degrees and smaller than 180 degrees, and
the second material is a material made of cermet.

9. The member according to claim 6,
wherein the member is a mold member configuring a part of a mold.

10. A method of manufacturing a member comprising the steps of:
(a) preparing a base member made of a first material;
(b) forming a plurality of stepwise stairs each having an upper surface, a side surface and a corner by machining the base member; and
(c) buildup-welding a shaped article on the base member by using an additive manufacturing method that supplies a powder material that is a second material that is different from the first material into a spot diameter of laser light while emitting the laser light,
wherein the laser light is emitted to the base member so as to be emitted to at least one of the corners.

11. The method of manufacturing the member according to claim 10,
wherein the powder material is a material made of cermet.

12. The method of manufacturing the member according to claim 10,
wherein the step (c) includes the steps of:
(c1) forming a first weld object on a first surface of the base member by supplying the powder material into the spot diameter of the laser light while emitting the laser light to the base member; and
(c2) forming a second weld object on a surface of the first weld object and a second surface of the base member, the second surface being adjacent to the first surface, by supplying the powder material into the spot diameter of the laser light while emitting the laser light to the first weld object.

13. The method of manufacturing the member according to claim 10,
wherein the step (c) includes the steps of:
(c3) forming a part of the shaped article while displacing a laser head emitting the laser light along a first track; and
(c4) forming another part of the shaped article while displacing the laser head along a second track,
when a length of the side surface, the length being parallel to an emission direction of the laser light, is defined as "L1" while a length of the upper surface, the length being in perpendicular to the emission direction of the laser light, is defined as "L2", the spot diameter of the laser light is larger than L2, and
the second track includes a track made by displacing a part of the first track by (i) L1 in a direction that is parallel to the side surface as well as perpendicular to an elongation direction of the corner and (ii) L2 in a direction that is parallel to the upper surface as well as perpendicular to the elongation direction of the corner.

14. The method of manufacturing the member according to claim 10,
wherein, when a length of the side surface is defined as L1 while a length of the upper surface is defined as L2, a "L1/L2" value of each stair is equal to or smaller than 4.

15. The method of manufacturing the member according to claim 10,
wherein an angle of the corner of each of the plurality of stairs is equal to or larger than 90 degrees and equal to or smaller than 120 degrees.

16. The method of manufacturing the member according to claim 10,
wherein the member is a mold member configuring a part of a mold.

* * * * *